(12) United States Patent
Furtek et al.

(10) Patent No.: US 10,318,260 B2
(45) Date of Patent: *Jun. 11, 2019

(54) METHOD AND APPARATUS FOR A COMPILER AND RELATED COMPONENTS FOR STREAM-BASED COMPUTATIONS FOR A GENERAL-PURPOSE, MULTIPLE-CORE SYSTEM

(71) Applicant: Cornami, Inc, Sunnyvale, CA (US)

(72) Inventors: Frederick Furtek, Menlo Park, CA (US); Paul Master, Sunnyvale, CA (US)

(73) Assignee: Cornami, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,032

(22) Filed: Apr. 2, 2018

(65) Prior Publication Data

US 2018/0225102 A1    Aug. 9, 2018

Related U.S. Application Data

(63) Continuation of application No. 14/825,827, filed on Aug. 13, 2015, now Pat. No. 9,934,011, which is a
(Continued)

(51) Int. Cl.
*G06F 9/445* (2018.01)
*G06F 8/41* (2018.01)
(Continued)

(52) U.S. Cl.
CPC ............... *G06F 8/45* (2013.01); *G06F 8/456* (2013.01); *G06F 8/54* (2013.01); *G06F 9/38* (2013.01); *G06F 9/445* (2013.01)

(58) Field of Classification Search
CPC .............. G06F 8/45; G06F 8/54; G06F 8/456; G06F 9/38; G06F 9/445
See application file for complete search history.

(56) References Cited

U.S. PATENT DOCUMENTS 4,319,321 A    3/1982   Anastas
5,121,490 A    6/1992   Ueda
(Continued)

FOREIGN PATENT DOCUMENTS

WO    WO 2009/137381 A1    11/2009

OTHER PUBLICATIONS

Sorina Dumitrescu et al. "Efficient Algorithms for Optimal Uneven Protection of Single and Multiple Scalable Code Streams against Packet Erasures", [Online], IEEE 2007, pp. 1-22, [Retrieved from Internet on Sep. 29, 2018], <http://www.ece.mcmaster.ca/~sorina/papers/TMM_07_UEP.pdf>.*
(Continued)

*Primary Examiner* — Ziaul A Chowdhury
(74) *Attorney, Agent, or Firm* — Nixon Peabody LLP

(57) ABSTRACT

A method and system of compiling and linking source stream programs for efficient use of multi-node devices. The system includes a compiler, a linker, a loader and a runtime component. The process converts a source code stream program to a compiled object code that is used with a programmable node based computing device having a plurality of processing nodes coupled to each other. The programming modules include stream statements for input values and output values in the form of sources and destinations for at least one of the plurality of processing nodes and stream statements that determine the streaming flow of values for the at least one of the plurality of processing nodes. The compiler converts the source code stream based program to object modules, object module instances and executables. The linker matches the object module instances to at least one of the multiple cores. The loader loads the tasks required by the object modules in the nodes and configure the nodes matched with the object module
(Continued)

instances. The runtime component runs the converted program.

15 Claims, 15 Drawing Sheets

Related U.S. Application Data continuation of application No. 13/204,164, filed on Aug. 5, 2011, now Pat. No. 9,110,692.

(60) Provisional application No. 61/371,350, filed on Aug. 6, 2010.

(51) Int. Cl.
*G06F 9/38* (2018.01)
*G06F 8/54* (2018.01)

(56) References Cited

U.S. PATENT DOCUMENTS

| | | | | |
|---|---|---|---|---|
| 5,278,986 A * | 1/1994 | Jourdenais | | G06F 8/45 712/23 |
| 5,287,537 A | 2/1994 | Newmark | | |
| 5,519,833 A * | 5/1996 | Agranat | | G06F 9/544 709/219 |
| 5,752,036 A | 5/1998 | Nakamura | | |
| 5,802,338 A | 9/1998 | Rechtschaffen | | |
| 5,946,487 A * | 8/1999 | Dangelo | | G06F 9/4843 345/502 |
| 5,963,745 A * | 10/1999 | Collins | | G06F 9/3838 712/10 |
| 6,032,269 A * | 2/2000 | Renner, Jr. | | G06F 11/0727 714/37 |
| 6,144,573 A | 11/2000 | Heile | | |
| 6,169,685 B1 | 1/2001 | Gandini | | |
| 6,199,093 B1 | 3/2001 | Yokoya | | |
| 6,201,811 B1 | 3/2001 | Larsson | | |
| 6,424,576 B1 | 7/2002 | Antosh | | |
| 6,732,354 B2 | 5/2004 | Ebeling | | |
| 6,983,460 B1 | 1/2006 | Goire | | |
| 7,243,333 B2 | 7/2007 | Grchwind | | |
| 7,254,809 B2 | 8/2007 | Kurhekar | | |
| 8,214,808 B2 | 7/2012 | Day | | |
| 8,225,300 B1 | 7/2012 | Webb | | |
| 8,296,316 B2 | 10/2012 | Jain | | |
| 8,621,446 B2 | 12/2013 | Archer | | |
| 864,534 A1 | 2/2014 | Fontenot | | |
| 9,760,530 B2 | 9/2017 | Harsha | | |
| 9,760,531 B2 * | 9/2017 | Harsha | | G06F 8/45 |
| 2001/0044850 A1 * | 11/2001 | Raz | | G06F 9/445 709/231 |
| 2003/0195938 A1 * | 10/2003 | Howard | | G06F 8/45 709/208 |
| 2004/0083462 A1 | 4/2004 | Gschwind | | |
| 2004/0172626 A1 * | 9/2004 | Jalan | | G06F 8/456 717/149 |
| 2004/0181786 A1 | 9/2004 | Allison | | |
| 2005/0038984 A1 | 2/2005 | Heidari-Bateni | | |
| 2005/0044344 A1 | 2/2005 | Stevens | | |
| 2006/0048106 A1 * | 3/2006 | Citron | | G06F 9/445 717/136 |
| 2006/0150165 A1 | 7/2006 | Hooper | | |
| 2006/0174234 A1 | 8/2006 | Arenburg | | |
| 2007/0038987 A1 | 2/2007 | Ohara | | |
| 2007/0150815 A1 | 6/2007 | Smith | | |
| 2007/0169027 A1 | 7/2007 | Drepper | | |
| 2007/0234313 A1 | 10/2007 | Teranishi | | |
| 2007/0294665 A1 * | 12/2007 | Papakipos | | G06F 8/45 717/119 |
| 2007/0294680 A1 * | 12/2007 | Papakipos | | G06F 8/456 717/149 |
| 2007/0294682 A1 * | 12/2007 | Demetriou | | G06F 8/45 717/153 |
| 2008/0084727 A1 | 4/2008 | Norman | | |
| 2008/0098179 A1 | 4/2008 | Kilbane | | |
| 2008/0098378 A1 * | 4/2008 | Kilbane | | G06F 8/54 717/162 |
| 2008/0127198 A1 | 5/2008 | Cometto | | |
| 2008/0282175 A1 * | 11/2008 | Costin | | G06F 8/38 715/760 |
| 2009/0089544 A1 * | 4/2009 | Liu | | G06F 16/24532 712/30 |
| 2010/0185719 A1 * | 7/2010 | Howard | | G06F 8/45 709/201 |
| 2010/0229162 A1 * | 9/2010 | Hada | | G06F 9/4494 717/156 |
| 2010/0235847 A1 | 9/2010 | Brehmer | | |
| 2010/0275189 A1 | 10/2010 | Cooke | | |
| 2011/0131558 A1 | 6/2011 | Young | | |
| 2011/0179252 A1 | 7/2011 | Master | | |
| 2011/0271263 A1 | 11/2011 | Archer | | |
| 2011/0296423 A1 | 12/2011 | Elnozahy | | |
| 2011/0305279 A1 | 12/2011 | Aggarwal | | |
| 2012/0144376 A1 * | 6/2012 | Van Eijndhoven | | G06F 8/456 717/146 |
| 2014/0101642 A1 | 4/2014 | Morrison | | |
| 2015/0081988 A1 * | 3/2015 | Bonetta | | G06F 9/38 711/155 |

OTHER PUBLICATIONS

Matt Germonprez et al., "Open Source Communities of Competitors", [Online], ACM 2013, pp. 54-59, [Retrieved from Internet on Sep. 29, 2018], <http://delivery.acm.org/10.1145/2530000/2527191/p54-germonprez.pdf>.*

Timo Wolf et al., "Predicting Build Failures using Social Network Analysis on Developer Communication", [Online], ACM 2013, pp. 1-11, [Retrieved from Internet on Sep. 29, 2018], <http://delivery.acm.org/10.1145/1560000/1555017/05070503.pdf>.*

Mohammed Yeasin, "Automated Approach for Testing Large Scale Software", [Online], Google Scholar Date: Unknown, pp. 1-13, [Retrieved from Internet on Sep. 29, 2018], <https://pdfs.semanticscholar.org/5b2e/5513eb562b2e111c6fb155678bcf44603a76.pdf>.*

K. Chakrabarty et al.; "Test Data Compression Using Dictionaries with Selective Entries and Fixed-Length Indices"; online, 2003, pp. 470-490; retrieved from <http://delivery.acm.org/10.1145/950000/944032/p470-I_II.pdf>.

K. Pagiamtzis et al.; "Content-Addressable Memory (CAM) Circuits and Architecture: A Tutorial and Survey"; online, 2006, pp. 712-727; retrieved from <http://ieeexplore.ieee.org/stamp/stamp.jsp?arnumber=1599540>.

E. Cheng et al.; "A Two's Complement Pipelin Multiplier"; online, 1976, pp. 647-650; retrieved from <https://authors.library.caltech.edu/53905/1/01169990.pdf>.

F. Keile et al.; "Programmable Memory Blocks Supporting Content-Addressable Memory"; online, 2000, pp. 1-9; retrieved from <https://s3.amazonaws.com/academia.edu.documents/32502532/1_2.pdf>.

Amir Hormati et al.; "Optimus: Efficient Realization of Streaming Applications on FPGAs"; Proceedings of the 2008 International Conference on Compilers, Architectures and Synthesis for Embedded Systems, Cases '08; Jan. 1, 2008, pp. 41-50.

Abhishek Das et al.; "Compiling for Stream Processing"; Proceedings of the 15th International Conference on Parallel Architectures and Compilation Techniques, PACT '06; Jan. 1, 2006, pp. 33-42.

European Search Report for Application No. 11815377.4, dated Jul. 22, 2014 (10 pages).

International Search Report for Application No. PCT/US2011/046766, dated Aug. 5, 2011 (4 pages).

Written Opinion of the International Searching Authority for Application No. PCT/US2011/046766, dated Apr. 6, 2012 (4 pages).

L. Brenna et al.; "Distributed Event Stream Processing with Non-deterministic Finite Automata"; online, 2009, pp. 1-12; retrieved from <http://citeseerx.ist.psu.edu/viewdoc/download?doi=10.1.1.155.4999&rep1&type=pdf>.

B. Bouzas et al.; "MultiCore Framework: An API for Programming Heterogeneous Multicore Processors"; online, 2006, pp. 1-6; retrieved from <http://citeseerx.ist.psu.edu/viewdoc/download?doi=10.1.1.120.4422&rep1&type=pdf>.

(56) References Cited

OTHER PUBLICATIONS

J. Donald et al.; "An Efficient, Practical Parallelization Methodology for Multicore Architecture Simulation"; online, 2006, pp. 1-4; retrieved from <mrmgroup.cs.princeton.edu/papers/jdonald-cal2006.pdf>.

M. Christen et al.; "PATUS: A Code Generation and Autotuning Framework for Parallel Iterative Stencil Computations on Modern Microarhcitectures"; online, 2011, pp. 676-687; retrieved from <http://ieeexplore.ieee.org/stamp/stamp.jsp?tp=&arnumber=6012879>.

\* cited by examiner

METHOD AND APPARATUS FOR A COMPILER AND RELATED COMPONENTS FOR STREAM-BASED COMPUTATIONS FOR A GENERAL-PURPOSE, MULTIPLE-CORE SYSTEM

CROSS-REFERENCE TO RELATED APPLICATIONS

This application is a continuation of U.S. application Ser. No. 14/825,827 filed on Aug. 13, 2015; U.S. application Ser. No. 14/825,827 is a continuation of U.S. patent application Ser. No. 13/204,164 filed Aug. 5, 2011, which claim priority from U.S. provisional application 61/371,350 filed Aug. 6, 2010. This application is related to U.S. patent application Ser. No. 09/815,122, filed on Mar. 22, 2001, now U.S. Pat. No. 6,836,839 entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS"; U.S. patent application Ser. No. 10/384,486, now U.S. Pat. No. 7,325,123 entitled HIERARCHICAL INTERCONNECT FOR CONFIGURING SEPARATE INTERCONNECTS FOR EACH GROUP OF FIXED AND DIVERSE COMPUTATIONAL ELEMENTS"; U.S. patent application Ser. No. 10/443,501, now U.S. Pat. No. 7,609,297 entitled "HARDWARE TASK MANAGER"; U.S. patent application Ser. No. 13/011,763 entitled "METHOD AND APPARATUS FOR A GENERAL-PURPOSE, MULTIPLE CORE SYSTEM FOR IMPLEMENTING STREAM-BASED COMPUTATIONS"; and U.S. provisional patent application 61/297,139 entitled "METHOD AND APPARATUS FOR A GENERAL-PURPOSE, MULTIPLE CORE SYSTEM FOR IMPLEMENTING STREAM-BASED COMPUTATIONS." All of these applications are hereby incorporated by reference.

TECHNICAL FIELD

This invention relates in general to programming multiple-processor systems and more specifically to a compiler and related components that efficiently utilizes parallel programming constructs incorporating both streams and threads.

BACKGROUND

A common limitation to processing performance in a digital system is the efficiency and speed of transferring instruction, data and other information among different components and subsystems within the digital system. For example, the bus speed in a general-purpose Von Neumann architecture dictates how fast data can be transferred between the processor and memory and, as a result, places a limit on the computing performance (e.g., million instructions per second (MIPS), floating-point operations per second (FLOPS), etc.).

Other types of computer architecture design, such as multi-processor or parallel processor designs require complex communication, or interconnection capabilities so that each of the different processors can communicate with other processors, multiple memory devices, input/output (I/O) ports, etc. With today's complex processor system designs, the importance of an efficient and fast interconnection facility rises dramatically. However, such facilities are difficult to design to optimize goals of speed, flexibility and simplicity.

Currently, parallel programming is based on threads as the central, organizing principle of computing. However, threads are flawed as a computation model because they are wildly non-deterministic and rely on programming style to constrain non-determinism to achieve deterministic aims. Test and verification become difficult in the presence of this wild non-determinism. One solution has been suggested to narrow the forms of parallelism expressible in the programming model, which is what the GPU (Graphics Processing Unit) vendors have done. Their focus on "data parallelism," however, ties the hands of programmers and prevents them from exploiting the full potential of multi-core processors.

Further, threads do not just run on a bank of identical cores. A modern computer (supercomputer, workstation, desktop and laptops) contains a bewildering array of different heterogeneous cores all requiring separate programming models to program. For example, one to four main CPUs (central processing unit—e.g. Pentium Processor) on a motherboard each having 1 to 6 CPU cores on die with an on-die or on-package GPU (Graphics Processing Unit—e.g. NVIDIA GPU) which itself contains 16 to 256 GPU cores along with several discrete video & audio encode & decode cores (for the encoding and decoding of a multiplicity of video standards—e.g. MPEG2, MPEG4, VC-1, H.264 etc.). Also on the motherboard are from 1 to 4 discrete high end GPUs each containing 16 to 1024 GPU cores along with several discrete high-end configurable (meaning the core can be selected to encode/decode a variety of pre-existing standards) video/audio encode & decode cores (for the encoding and decoding of a multiplicity of video standards—e.g. MPEG2, MPEG4, VC-1, H.264 etc., at very high resolutions and with multiple channels of sound). Additional subsystems composed of processing cores are added to the motherboard in the form of communications cores (e.g. TCP/IP offload cores which themselves are typically built from one or more CPU cores and one or more packet processing cores. WiFi cores, Blue Tooth cores, WiMax cores, 3G cores, 4G cores which are from one or more CPU cores and one or more broadband/baseband processing cores).

Some high end devices such as supercomputers add an additional processor in the form of one to four FPGAs (field programmable gate array) per motherboard. Each FPGA is itself composed of hundreds of thousand to tens of millions of very simplistic CLB processing cores along with multiple hard IP or soft IP CPU core and multiple DSP cores). Then these motherboards themselves are then replicated and interconnected in the hundreds to thousands to produce a modern supercomputer. These systems (either the desktops/workstations/laptops and/or the supercomputers) and then interconnected via the Internet to provide national and global computing capabilities.

The complexity of "managing" and "programming" such a diverse series of cores is a severe problem. Most programmers do not even attempt this and just settle for programming just one CPU core ignoring the rest of the cores. There are a certain number of algorithms know in the industry as "embarrassingly parallel problems" (e.g. the Google Search algorithm for example is simple to spread across multiple CPUs due to the fact that there is very little to no interactivity across the parallel threads). Unfortunately the vast majority of problems do not have these characteristics, they require a high degree of interactivity and synchronization across the multiple threads.

It would therefore be desirable to incorporate multithreading, unrestricted parallelism and deterministic behavior such as in modern programming languages to streams. Streams date at least to the introduction of the C programming language in 1978, and have been incorporated into such languages as C++, Java, Visual Basic and F#. However, in these languages streams are relegated to a rather narrow role of providing a framework for I/O and file access. It is therefore desirable to expand the role of streams in parallel programming to first-class objects, a status roughly comparable to that of variables. A compiler and related components are needed to convert source code Stream programs to object code adapted to multi-core systems including configurable hardware cores.

SUMMARY

According to one example, a system to convert a source code stream based program to execute on a multiple core computing device is disclosed. The system includes a compiler to convert the source code stream based program to object modules, object module instances and executables. A linker matches the object module instances to at least one of the multiple cores. A loader loads the tasks required by the object modules in the nodes and configures the cores matched with the object module instances. A runtime component runs the converted program.

Another example is a non-transitory, machine-readable medium having stored thereon instructions for converting a source code program including stream domain code and thread domain code for execution on a multiple node computing device. The medium comprises machine executable code which when executed by at least one machine, causes the machine to convert the source code program to object modules, object module instances and executables.

Another example is a non-transitory, machine-readable medium having stored thereon instructions for converting a source code program including stream domain code and thread domain code for execution on a multiple node computing device. The medium comprises machine executable code which when executed by at least one machine, causes the machine to read an object module instance converted from the source code program including stream domain code and thread domain code. The executable code also causes the machine to match the object module instance to at least one of the multiple cores on the multiple core computing device.

Another example is a non-transitory, machine-readable medium having stored thereon instructions for converting a source code program including stream domain code and thread domain code for execution on a multiple node computing device. The medium comprises machine executable code which when executed by at least one machine, causes the machine to read an object module converted from the source code program including stream domain code and thread domain code. The executable code causes the machine to determine tasks required by the object module. The executable code causes the machine to configure a node of the multiple core computing device. The node is matched with an object module instance converted from the source code program.

Additional aspects of the invention will be apparent to those of ordinary skill in the art in view of the detailed description of various embodiments, which is made with reference to the drawings, a brief description of which is provided below.

DETAILED DESCRIPTION OF THE PREFERRED EMBODIMENT

Adaptive Computing Engine and Adaptive Computing Machine

Figure 1:
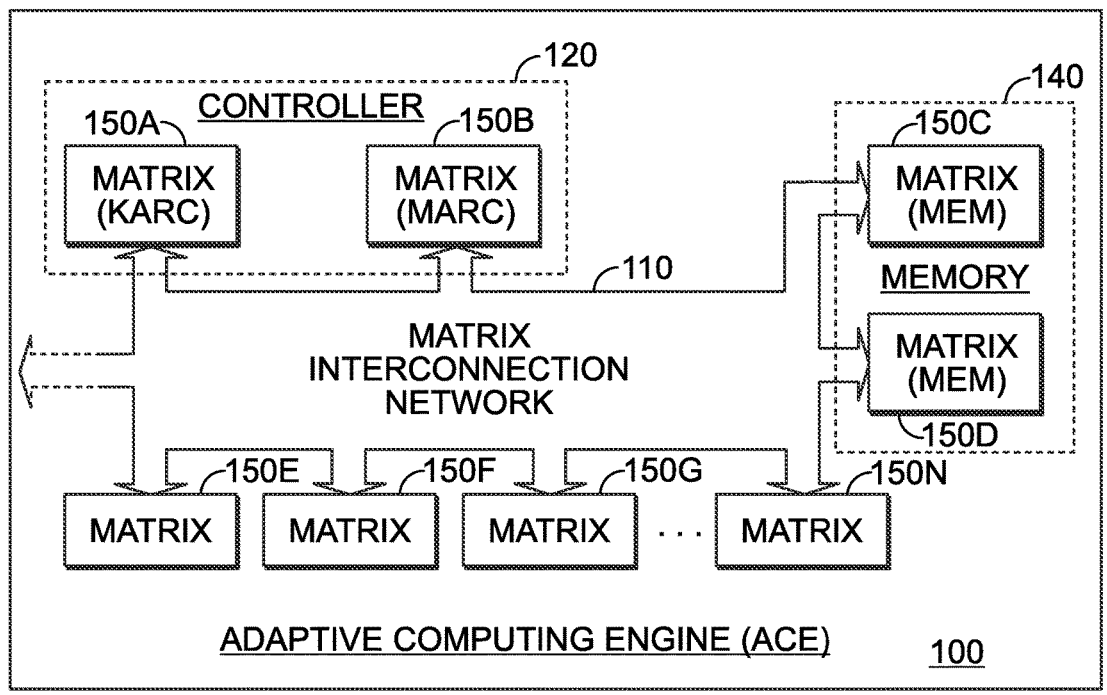
FIG. 1 shows an overview of an adaptable computing engine compatible with a disclosed stream based programming model and associated compiler and other components.

FIG. 1 is a block diagram illustrating an example of a multi-processor system using an example computational model. Apparatus 100, referred to herein as an adaptive computing engine (ACE) 100, is preferably embodied as an integrated circuit, or as a portion of an integrated circuit having other, additional components. In the exemplary embodiment, and as discussed in greater detail below, the ACE 100 includes one or more reconfigurable matrices (or nodes) 150, such as matrices 150A through 150N as illustrated, and a matrix interconnection network 110. Also in this example, and as discussed in detail below, one or more of the matrices 150, such as matrices 150A and 150B, are configured for functionality as a controller 120, while other matrices, such as matrices 150C and 150D, are configured for functionality as a memory 140. The various matrices 150 and matrix interconnection network 110 may also be implemented together as fractal subunits, which may be scaled from a few nodes to thousands of nodes.

In this example, the ACE 100 does not utilize traditional (and typically separate) data, DMA, random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, in real-time, to provide any given connection between and among the reconfigurable matrices 150, including those matrices 150 configured as the controller 120 and the memory 140.

The matrices 150 configured to function as memory 140 may be implemented in any desired or exemplary way, utilizing computational elements (discussed below) of fixed memory elements, and may be included within the ACE 100 or incorporated within another IC or portion of an IC. In this example, the memory 140 is included within the ACE 100, and preferably is comprised of computational elements which are low power consumption random access memory (RAM), but also may be comprised of computational elements of any other form of memory, such as flash, DRAM, SRAM, MRAM, ROM, EPROM or E2PROM. In this example, the memory 140 preferably includes direct memory access (DMA) engines, not separately illustrated.

The controller 120 is preferably implemented using matrices 150A and 150B configured as adaptive finite state machines (FSMs), as a reduced instruction set ("RISC") processor, controller or other device or IC capable of performing the two types of functionality discussed below. (Alternatively, these functions may be implemented utilizing a conventional RISC or other processor.) The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the exemplary form of combined data, configuration and control information referred to herein as a "silverware" module.

The matrix interconnection network 110 of FIG. 1, includes subset interconnection networks (not shown). These can include a Boolean interconnection network, data interconnection network, and other networks or interconnection schemes collectively and generally referred to herein as "interconnect", "interconnection(s)" or "interconnection network(s)," or "networks," and may be implemented generally as known in the art, such as utilizing FPGA interconnection networks or switching fabrics, albeit in a considerably more varied fashion. In the exemplary embodiment, the various interconnection networks are implemented as described, for example, in U.S. Pat. No. 5,218,240, U.S. Pat. No. 5,336,950, U.S. Pat. No. 5,245,227, and U.S. Pat. No. 5,144,166. These various interconnection networks provide selectable (or switchable) connections between and among the controller 120, the memory 140, the various matrices 150, and the computational units (or "nodes") and computational elements, providing the physical basis for the configuration and reconfiguration referred to herein, in response to and under the control of configuration signaling generally referred to herein as "configuration information." In addition, the various interconnection networks 110 provide selectable or switchable data, input, output, control and configuration paths, between and among the controller 120, the memory 140, the various matrices 150, and the computational units, components and elements, in lieu of any form of traditional or separate input/output busses, data busses, DMA, RAM, configuration and instruction busses.

It should be pointed out, however, that while any given switching or selecting operation of, or within, the various interconnection networks may be implemented as known in the art, the design and layout of the various interconnection networks, in accordance with the disclosed examples, are new and novel, as discussed in greater detail below. For example, varying levels of interconnection are provided to correspond to the varying levels of the matrices, computational units, and elements. At the matrix 150 level, in comparison with the prior art FPGA interconnect, the matrix interconnection network 110 is considerably more limited and less "rich," with lesser connection capability in a given area, to reduce capacitance and increase speed of operation. Within a particular matrix or computational unit, however, the interconnection network may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable nodes, or computational units; the nodes, in turn, generally contain a different or varied mix of fixed, application specific computational components and elements that may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110. Details of the ACE architecture can be found in the related patents and applications, referenced above.

Figure 2:
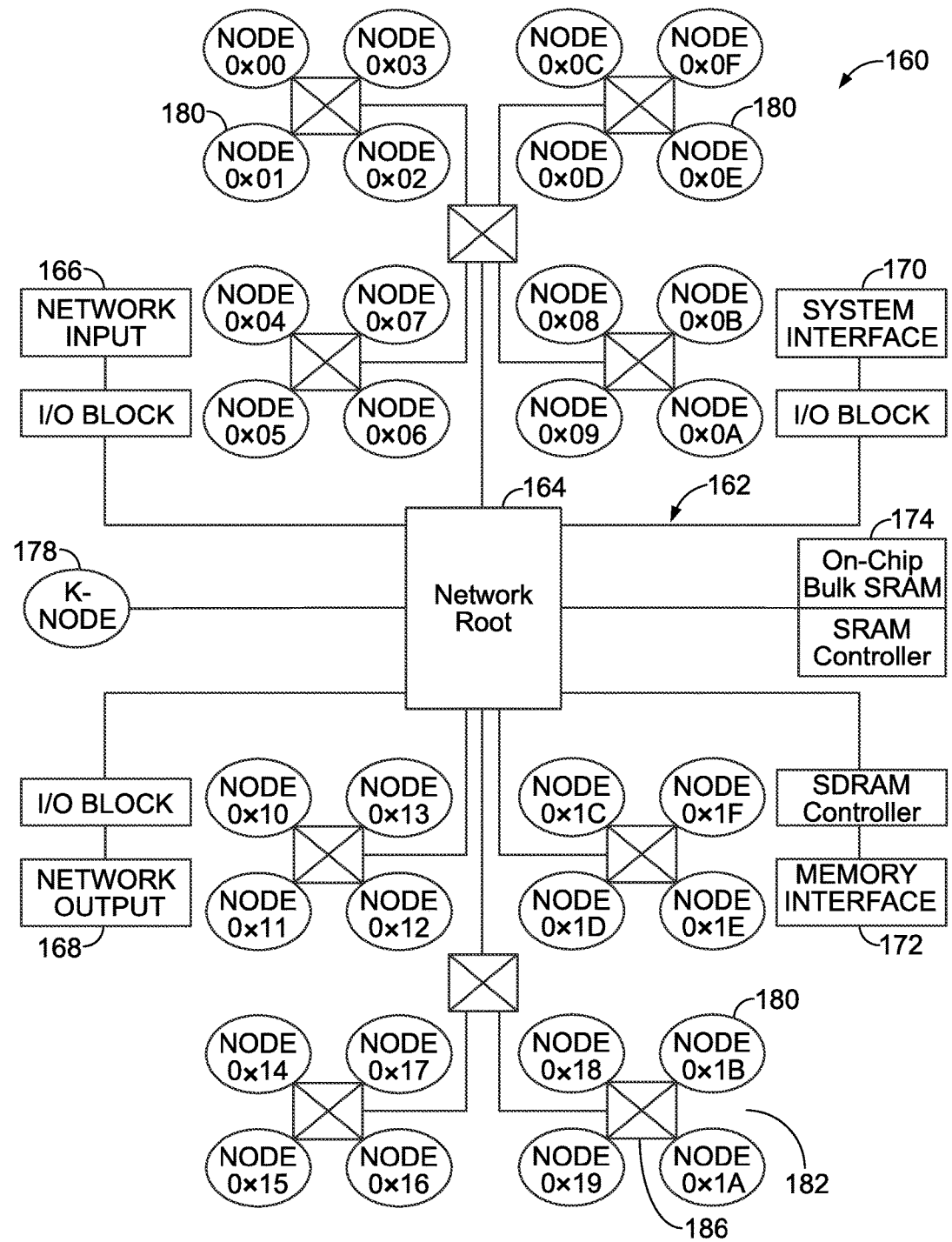
FIG. 2 illustrates a block diagram of an adaptive computing machine compatible with the programming model and associated compiler and other components.

Another example of an adaptive computing machine 160 that may use the parallel computational model is shown in FIG. 2. The adaptive computing machine 160 in this example has thirty-two heterogeneous leaf nodes 180 that are coupled together via a network 162. The network 162 has a single root 164 that is coupled to a group of network input ports 166, a group of network output ports 168, an optional system interface port 170, an external memory interface 172 and an internal memory interface 174. A supervisor node or K-node 178 is also coupled to the root 164.

The nodes 180 are each grouped in quadtrees such as the quadtree 182. The quadtrees such as the quadtree 182 are implemented using 5-ported switch elements 184, each connected to a single parent and up to four children nodes 180. The switch elements implement a fair, round-robin arbitration scheme and provide pipelining with multi-level look-ahead for enhanced performance. In this example, the width of all paths is constant (51 bits), but the option is available to widen pathways as a tree is ascended, in the style of Leiserson's fat trees, in order to increase network bandwidth.

Node Wrapper

Figure 3:
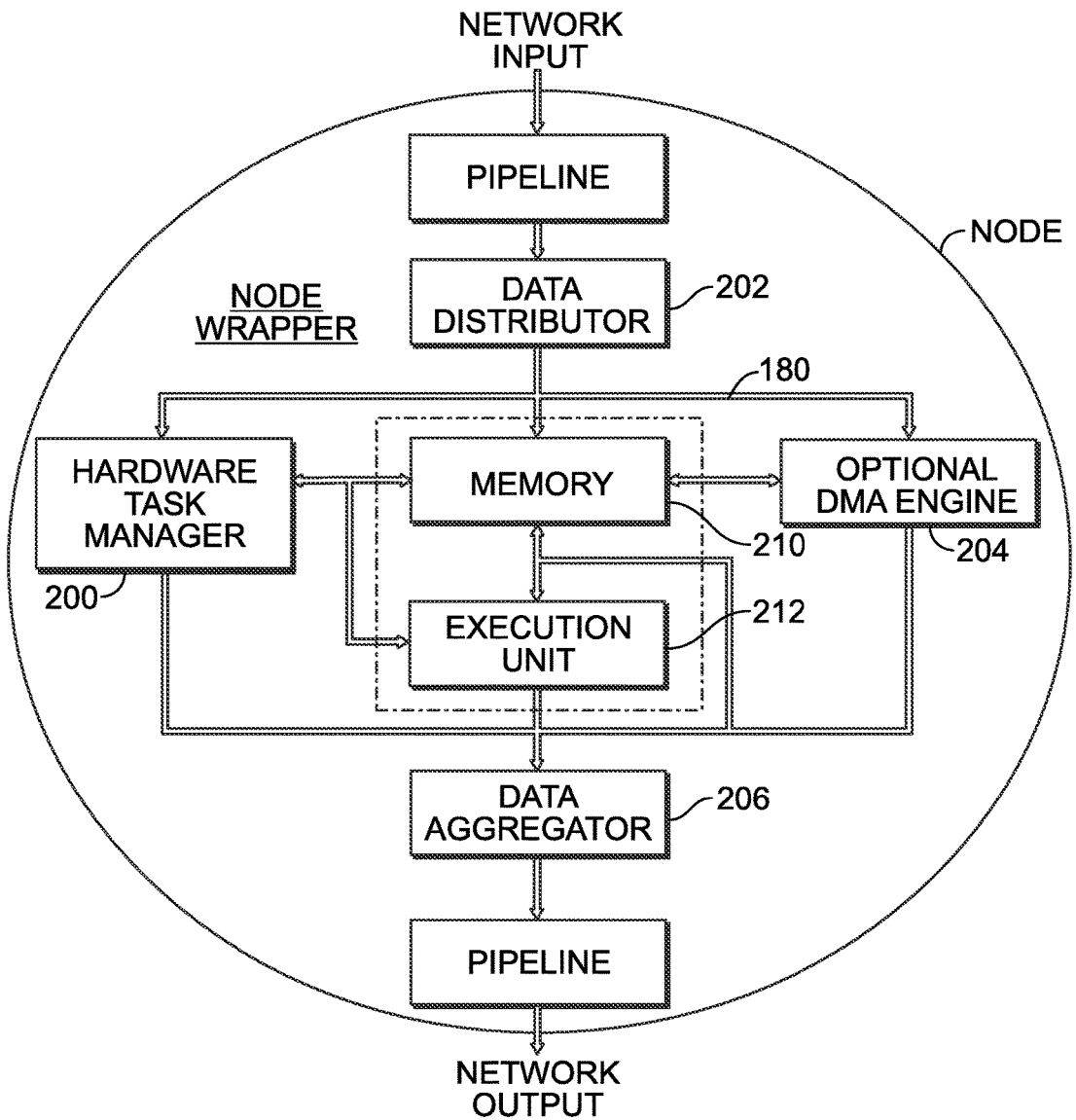
FIG. 3 illustrates the node wrapper interface between heterogeneous nodes and the homogenous network in the ACE architecture in FIG. 1 or ACM architecture in FIG. 2.

FIG. 3 illustrates the interface between heterogeneous nodes and the homogenous network in the ACE architecture in FIG. 1 or the ACM architecture in FIG. 2. This interface is referred to as a "node wrapper" since it is used to provide a common input and output mechanism for each node. A node's execution units and memory are interfaced with the network and with control software via the node wrapper to provide a uniform, consistent system-level programming model. In this example, the node 180 includes a memory 210 and an execution unit 212. Details of the node wrapper may be found in the related patents and applications referenced, above.

In this example, each node wrapper includes a hardware task manager (HTM) 200. Node wrappers also include data distributor 202, optional direct memory access (DMA) engine 204 and data aggregator 206. The HTM coordinates execution, or use, of node processors and resources, respectively. The HTM does this by processing a task list and producing a ready-to-run queue. The HTM is configured and controlled by a specialized node referred to as a K-node 178 in FIG. 2 or control node (not shown). However, other HTM control approaches may be used.

The node wrapper in FIG. 3 makes the node 180 identical in outward appearance to all other nodes in the adaptive computing machine 160 in FIG. 2 or the adaptive computing engine 100 in FIG. 1 regardless of its internal structure or functionality. The node wrapper also relieves the execution unit 212 from having to deal with myriad activities associated with task management and network interactions. Among other things, the node wrapper is responsible for disposing of each incoming network word in an appropriate fashion on each clock cycle.

The execution unit 212 in FIG. 3 is responsible for executing tasks (a task is equivalent to a module instance). The execution unit 212 may include a digital signal processor (DSP), a reduced-instruction-set (RISC) processor, a domain-specific processor, an application-specific integrated circuit (ASIC) or a reconfigurable (FPGA) fabric. Regardless of its form, the execution unit 212 interacts with the node wrapper through a standard interface.

The nodal memory 210 is accessible to both the node wrapper and the execution unit 212. The nodal memory 210 is where the node wrapper deposits incoming streaming data and where the execution unit 212 accesses that data. A node's own memory 210, however, is typically not where the execution unit 212 sends output data. To minimize memory accesses, output data is usually sent directly to the node(s) requiring that data: the consumer node(s). Nodal memory 210 is also used to store task parameters and is available to tasks for temporary (scratchpad) storage.

Figure 4A:
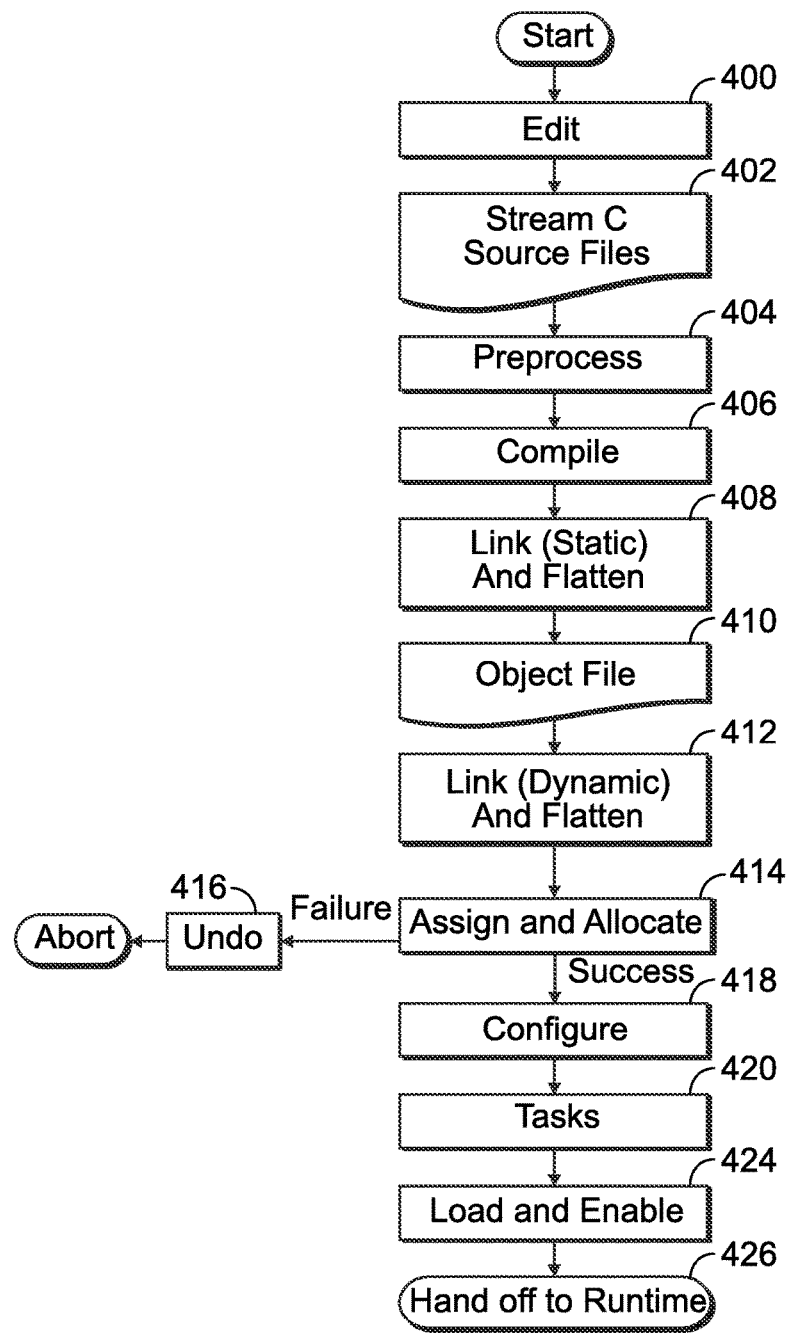
FIG. 4A is a flow diagram of the process of compiling, linking and loading a stream-based program for the adaptable computing engine and machine in FIGS. 1-2.

The steps in compiling, linking and loading a Stream C program for the adaptive computing systems 100 and 160 of FIGS. 1 and 2 are illustrated in FIG. 4A. Stream C is a thread and stream based language for efficient programming of multi-core systems as further explained by related application Ser. No. 13/011,763 filed on Jan. 21, 2011. As indicated, each step in FIG. 4A is performed at either edit time, compile time or load time. The edit time is the time during which a programmer creates (edits) a Stream C source program. The compile time is the point in time when a Stream C source program is compiled and statically linked. The load time is the point in time when a stream-based object program is prepared for execution on a multi-core computing system such as the adaptive computing systems 100 and 160 of FIGS. 1 and 2. The run time is the time during which a stream-based program executes on a multi-core computer system such as the adaptive computing systems 100 and 160 of FIGS. 1 and 2.

In FIG. 4A, editing occurs at edit time of a stream C program (400). The stream C program is produced in source files (402) at edit time. The stream C program is preprocessed at compile time (404). The stream C program is then compiled which is performed at compile time (406). The static links are established and the program is flattened (408). The result is an object file (410).

The stream C program is dynamically linked and flattened at load time (412). The object code is assigned and allocated to the nodes during the load time (414). If the object code cannot be assigned, the assignments and allocations are undone (416). If the object code can be assigned, the nodes are configured at the load time (418). Tasks are thereby established for the nodes (420). The object code is then loaded and the system is enabled during load time (424). The object code then is handed off to runtime (426).

The module hierarchy of the Stream C source program has been flattened so that each object module encapsulates just one of an operation, a function call or a thread-domain code accessing module inputs and or output streams. The Stream C source files produced at edit time (402) contain source modules, source module instances and source code for called functions. The compiler process then preprocesses the source files (404) by expanding module-array instances, flattening module hierarchy and converting multi-source and multi-destination streams to match the capabilities of the target architecture. The preprocessing also includes converting stream expressions to module instances. The process then compiles the source files (406). The compilation includes compiling source modules into object modules, compiling source module instances into object module instances and source code for called functions into executables.

The produced object files (410) therefore contain object modules, object module instances and executables. The static linking involves resolving as many non-stream related references in the object codes as possible. The flattening of the module hierarchy (412) results in each source module encapsulating just one of an operation appearing in one or more stream expressions, a function call in a stream expression, a module whose body contains thread-domain code or a module whose body is defined externally.

The principal steps at the load time are linking object files and loading tasks into a multi-core computer system such as the systems 100 or 160 in FIGS. 1 and 2. The dynamic linking is performed by using DLLs to resolve remaining non-stream related references in the object code. The module hierarchy is flattened (412) so that each object module encapsulates just one of an operation in a stream expression, a function call in a stream expression, a module whose body contains thread-domain code or a module whose body is defined externally. The assignment of nodes involves assigning a node such as that in FIG. 3 and a task to each object module instance. A node input port is assigned to each input stream and a node output port is assigned to each output stream. The allocation of space in node memories involves allocating space in the node memories for executables, input FIFO queues, variables and stacks and task-related tables. The produced tasks (420) are binary data representing an object module instance. Each task contains node and port assignments, memory allocations, a pointer to an object module executable, pointers to executables for called functions, initial values for program variables and input FIFO queues and configuration data. The tasks are supplied to the loader.

Figure 4B:
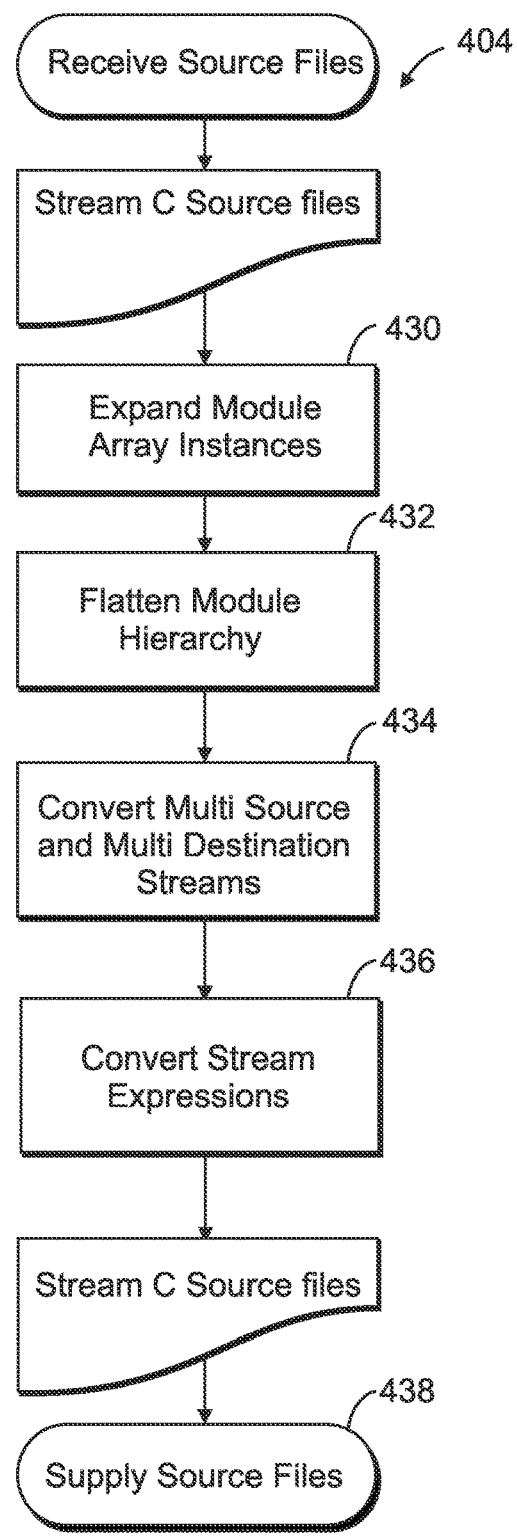
FIG. 4B is a detailed flow diagram of the preprocessing procedure in FIG. 4A.
Figure 4C:
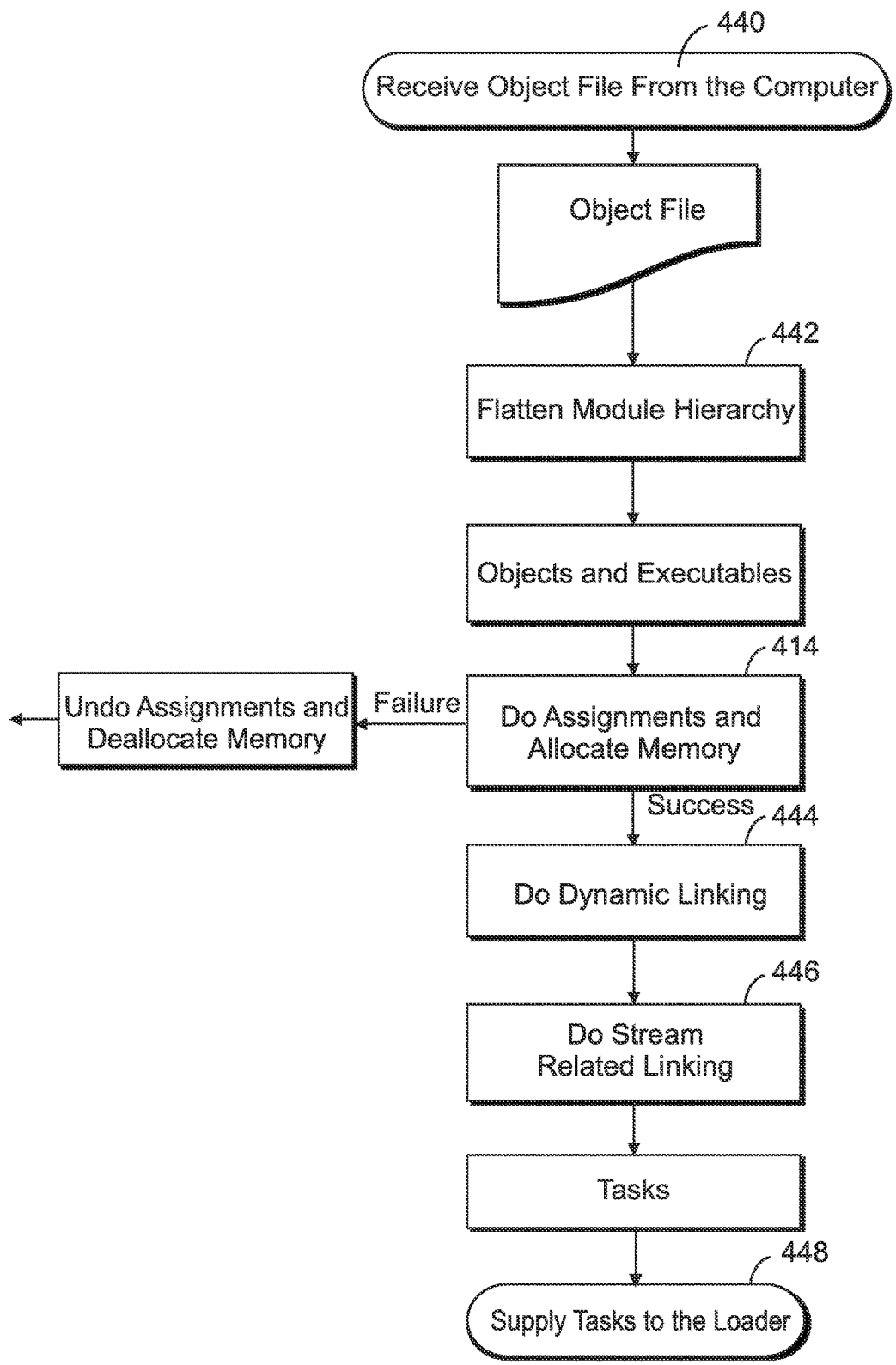
FIG. 4C is a flow diagram of the linker processing procedure in FIG. 4A.

FIG. 4B is a flow diagram showing the steps of preprocessing source files (404) in FIG. 4A. FIG. 4B shows expanding module array instances (430). The module hierarchy is then flattened (432). The multi-source and multi-destination streams are converted (434). The stream expressions are then converted (436). Stream C source files in ASCII files are produced and supplied to the compiler (438). FIG. 4C is a diagram of the assignment and linking process as will be explained below.

Figure 4D:
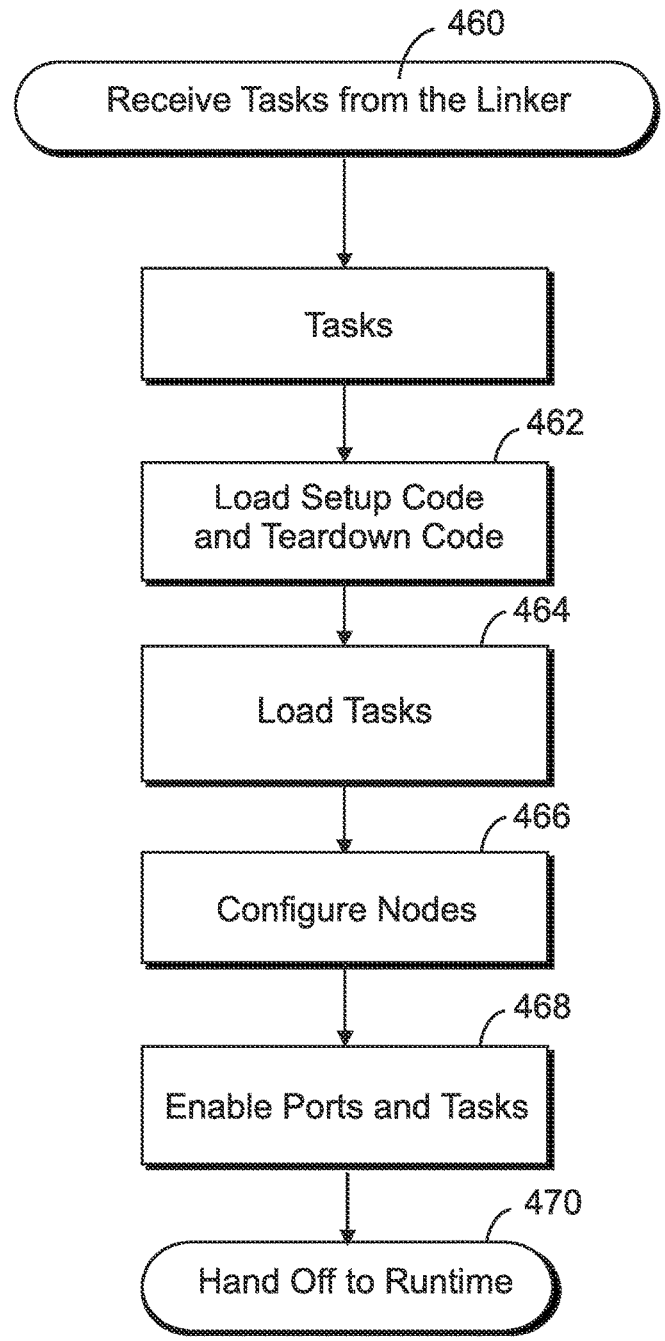
FIG. 4D is a flow diagram of the loader process in FIG. 4A.

FIG. 4D shows the load and enable steps (424) of FIG. 4A. The tasks are loaded from the linker (460). The setup code and teardown code are loaded for each node hosting a task (462). One copy of the task setup code and one copy of the task teardown code are written into the space allocated in the node's memory. The tasks are then loaded (464). For each node assigned instances of an object module, a separate copy of the object module executable for each instance of the object module running on the node or a shared copy of the object module's executable for the instances of the object module running on the node are written in the allocated space in the node memory. Executables for functions called, directly or indirectly, by the object-module executable are loaded into the space. Initial values for program variables and input FIFO queues for each instance of the object module running on the node are written into the space. A configured task parameter list (TPL) for each instance of the object module running on the node is written in the space.

The nodes then are configured (466). For each downloaded task, the node input and output ports assigned to the task are configured. For each input port assigned to the task, the port's entry in the assigned port to address translation table is configured. A pointer to the task's task parameter list is inserted into the task's entry in the assigned node's TBL pointer table. The task's entry in the assigned node's state information table is configured as will be explained below. The task is placed on the assigned node's ready to run queue if the task is ready to run at the program start. The ports and tasks are then enabled (468). After completion of the loading, the runtime system of the node begins operating to run the program.

Data Structures

Data structures play a central role in compiling, linking, loading and executing (running) stream-based programs. These data structures are divided into four categories: a) stream C source files produced by a programmer; b) object data structures produced by the preprocessor/compiler/static-linker; c) runtime data structures produced by the dynamic-linker/loader and used by the stream runtime; and d) network words sent on the inter-node network of the target machine such as the adaptive computing engine 100 in FIG. 1 or the adaptive computing machine 160 in FIG. 2.

Figure 5A:
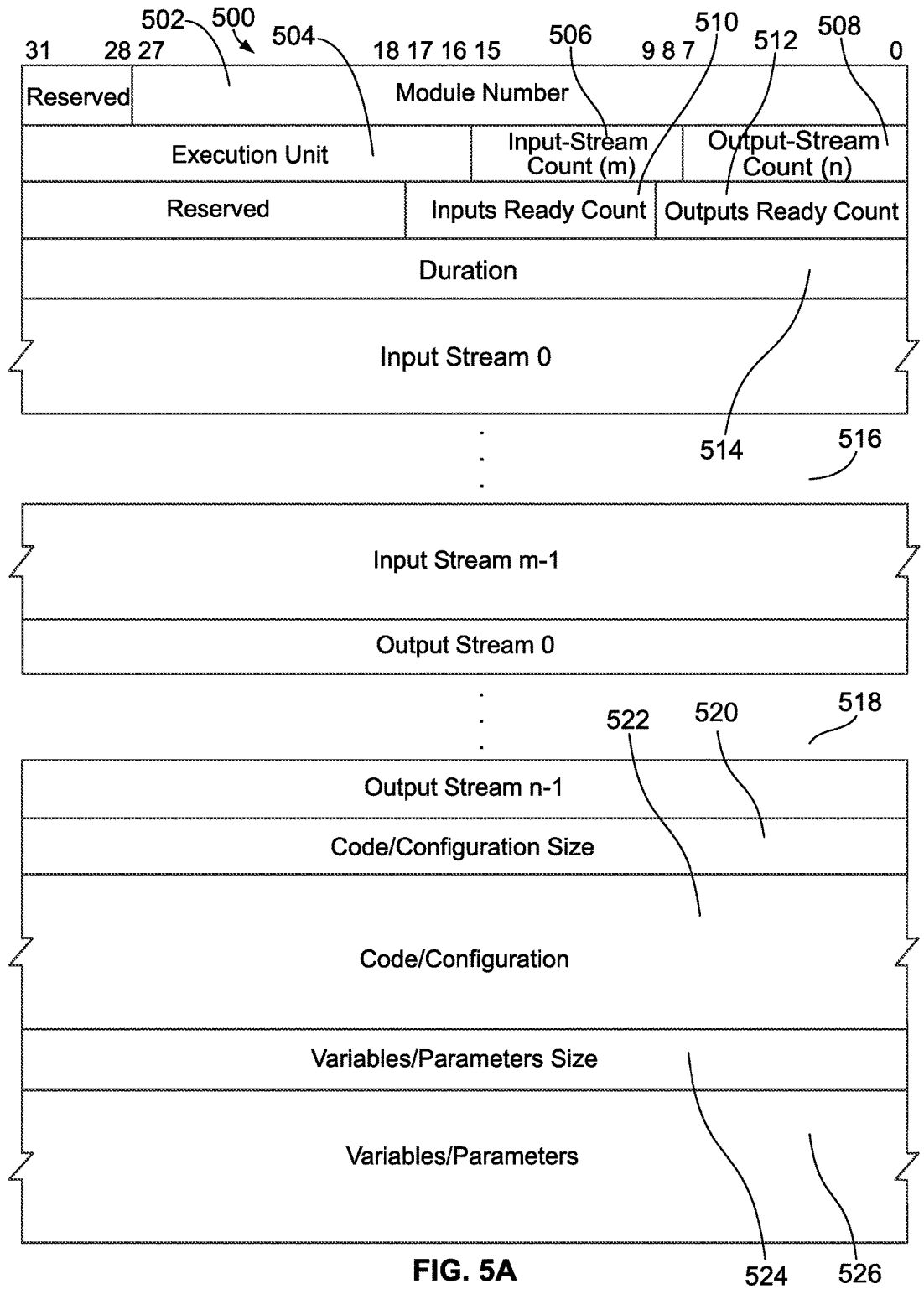
FIG. 5A is a diagram of the format of an object module which is the counterpart to a stream program source module.

As explained above, the preprocessor/compiler/static-linker shown in FIG. 4A produces object code containing two types of data structures, object modules and object module instances, and two types of substructures, object input streams and object output streams. FIG. 5A shows the format of an object module 500 which is the counterpart to a (source) module in Stream C. The object module 500 includes a module number field 502, an execution unit field 504, an input-stream count field 506, an output-stream count field 508, an inputs ready count field 510, an outputs ready count field 512, a duration field 514, an input stream input $i^{th}$ field 516, an output stream $i^{th}$ field 518, a code/configuration size field 520, a code/configuration field 522, a variables/parameters size field 524 and a variables/parameters size field 526.

The module number field 502 in this example is a 28-bit unsigned integer, assigned by the compiler, uniquely identifying this object module 500 within the object program. The execution unit field 504 in this example is a 16-bit field indicating the target execution unit for the code/configuration of the object module 500. The execution unit field 504 is determined by the compiler using information supplied by the source code and/or user. The types of execution units may fall into three broad categories: (a) conventional stored-program processors, (b) application-specific hardware and (c) reconfigurable hardware. The execution unit may be set for just this object module as opposed to the program as a whole by inserting a compiler directive of the form:

set ExecutionUnit eu in the body of the source module. This directive overrides any program-wide directive and sets the execution unit for the object module 500 to eu.

The input-stream count field 506 is an 8-bit unsigned integer indicating the number of input streams of the object module 500 and the source module from which it was derived. The output-stream count field 508 is an 8-bit unsigned integer indicating the number of output streams of the object module 500 and the source module from which it was derived. The inputs ready count field 510 is a 9-bit signed integer providing the initial value for a runtime input ready count that is associated with each runtime instance of the module. This runtime count, which is dynamic, indicates that the runtime instance (task) is either: ready to run on the input side when the value of the count is non-negative (sign bit is 0) or not ready to run on the input side when the value of the count is negative (sign bit is 1). By providing the initial value for this runtime count, the compile-time inputs ready count determines the minimum number of input streams that must be ready (those having a non-negative consumer count) in order for the runtime count to be non-negative as will be explained below.

For example, if the compile-time inputs ready count=irc, then (r−irc) out of m input streams must be ready, where r is the number of ready input streams at system initialization (streams with non-negative consumer counts in the input stream fields below) and m is the value in the input-stream count field 506 above. There are two typical cases:

r=0 and irc=−m: m out of m (i.e., all) input streams must be ready; and r=0 and irc=−1: 1 out of m input streams must be ready (r=0 reflects the fact that input-stream FIFO queues are typically empty at system initialization and therefore not ready to supply data values). The default value of inputs ready count is r−m (all streams must be ready), but this value can be overridden by inserting a compiler directive of the form:

set InputsReadyCount irc in the body of the source module. This directive overrides the default and sets the inputs ready count for the object module to irc.

The outputs ready count field 512 is a 9-bit signed integer providing the initial value for a runtime outputs ready count that is associated with each runtime instance of the module. This runtime count, which is dynamic, indicates that the runtime instance (task) is either: ready to run on the output side when the value of the count is non-negative (sign bit is 0); or not ready to run on the output side when the value of the count is negative (sign bit is 1). By providing the initial value for this runtime count, the compile-time outputs ready count determines the minimum number of output streams that must be ready (have a negative producer count) in order for the runtime count to be non-negative.

For example, if the compile-time outputs ready count=orc, then (r−orc) out of n output streams must be ready, where r is the number of ready output streams at system initialization (streams with negative producer counts in the output stream fields below) and n is the value in the output-stream count field 506 above. There are two typical cases:

r=n and orc=0: n out of n (i.e., all) output streams must be ready; or r=n and orc=n−1: 1 out of n output streams must be ready (r=n reflects the fact that input-stream FIFO queues are typically empty at system initialization and therefore ready to receive data values). The default value of outputs ready count is r−n (all streams must be ready), but this value can be overridden by inserting a compiler directive of the form:

set OutputsReadyCount orc in the body of the source module. This directive overrides the default and sets outputs ready count for the object module 500 to orc.

The duration field 514 is a 32-bit unsigned integer indicating the number of execution-unit clock cycles each activation of this module instance is allowed to run before it times out. A value of 0 represents an infinite duration i.e., the module instance does not time out. The default value is 65536, but this value may be overridden by inserting a compiler directive of the form:

set Duration d in the body of the source module. This directive overrides the default and sets duration for the object module to d.

The input stream fields 516 are fields containing details of the i$^{th}$ input stream of the module instance 500. The subfields in this field are described below with reference to FIG. 5B. The input stream fields 516 are omitted if the input-stream count field 506 is 0. The output stream fields 518 are fields containing details of the i$^{th}$ output stream of the module instance 500. The subfields in this field are described below with reference to FIG. 5C. The output stream fields 518 are omitted if the output-stream count field 512 is 0.

The code/configuration size field 520 is a 32-bit unsigned integer indicating the size, in 32-bit words, of the code/configuration of the object module 500. The code/configuration field 522 is the code of the object module 500 for the case where the execution-unit specifies a stored-program processor or configuration for the case where the execution-unit specifies either application-specific or reconfigurable hardware. The variables/parameters size field 524 is a 32-bit unsigned integer indicating the size, in 32-bit words, of the module-instance's variables/parameters. The variables/parameters field 526 is the variables of the module instance for the case where the execution-unit field 404 specifies a stored-program processor or parameters for the case where the execution-unit field 504 specifies either application-specific or reconfigurable hardware.

Figure 5B:
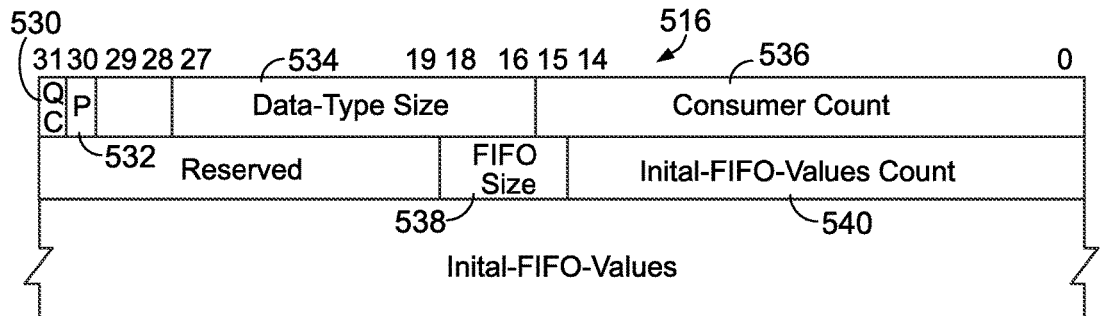
FIG. 5B is a diagram of the format of an input stream field in the object module in FIG. 5A.

FIG. 5B shows the format of each input stream field 516 in FIG. 5A. The input stream field includes a QC field 530, a ping field 532, a data-type size field 534, a consumer count field 536, a FIFO size field 538, an initial FIFO values count field 540 and an initial FIFO values count field 542.

The QC field 530 is a Boolean value indicating whether this stream is: (a) a regular or ping stream or (b) a quasi-constant stream. 0 (false) indicates a regular or ping stream while 1 (true) indicates a quasi-constant stream. The ping field 532 is a Boolean value indicating whether this stream is of the type ping. 0 (false) indicates a non-ping stream while 1 (true) indicates a ping stream. If the value of the ping field is 1, then the data-type size, FIFO size and initial-FIFO-values count fields 534, 538 and 540 are all ignored since pings do not have values and there is therefore no need for the fields (the initial-FIFO-values field 542 is omitted for the same reason).

The data-type size field 534 is a 12-bit unsigned integer indicating the size, in 32-bit words, of the stream's data type. The consumer count field 536 is a 16-bit signed integer providing the initial value for a runtime consumer count that is associated with a runtime version of the input stream in each runtime instance of the module. This runtime count, which is dynamic, indicates whether the input stream is ready. Whether an input stream is ready is whether there are a sufficient number of data values in the stream's FIFO queue for the module instance to execute. A non-negative runtime count (the sign bit is 0) indicates a sufficient number of values. A negative runtime count (the sign bit is 1) indicates an insufficient number of values. A negative count thus reflects a deficit of values, a positive count a surplus of values and a zero count just enough values. The default value is −1, but this value can be overridden for input stream inStrm by inserting a compiler directive of the form:

set inStrm ConsumerCount cc in the body of the source module. This directive overrides the default and sets the consumer count for inStrm to cc.

The FIFO size field 538 is a 4-bit field encoding the size, in 32-bit words, of the input-stream's circular FIFO queue. The following table shows the power-of-two FIFO size for each 4-bit encoding:

TABLE 1

FIFO ENCODING

| 4-Bit Encoding | FIFO Size in 32-Bit Words | Number of Low-Order Address Bits that Toggle |
|---|---|---|
| 0000 | 1 | 0 |
| 0001 | 2 | 1 |
| 0010 | 4 | 2 |
| 0011 | 8 | 3 |
| 0100 | 16 | 4 |
| 0101 | 32 | 5 |
| 0110 | 64 | 6 |
| 0111 | 128 | 7 |
| 1000 | 256 | 8 |
| 1001 | 512 | 9 |
| 1010 | 1,024 | 10 |
| 1011 | 2,048 | 11 |
| 1100 | 4,096 | 12 |
| 1101 | 8,192 | 13 |
| 1110 | 16,384 | 14 |
| 1111 | 32,768 | 15 |

The default value of the FIFO size field 538 is 1 (data-type value) for quasi-constant streams and 2 (data-type values) for regular streams. The value for quasi-constant streams cannot be overridden, but the value for regular streams can be. That is done for input stream inStrm by inserting a compiler directive of the form set inStrm FIFOsize fs in the body of the source module. This directive sets the FIFO size for inStrm to the smallest power-of-two 32-bit words that accommodates f s data values. The initial-FIFOvalues count field 542 is a 15-bit unsigned integer indicating the number of initial values in the input stream's FIFO queue.

The initial-FIFO-values field 540 is the initial values, aligned on 32-bit boundaries, that the linker/loader places in the input-stream's FIFO queue at system initialization. The values are listed first to last. This field is omitted if the initial-FIFO-values count is 0, which is the default. The programmer may override this default for input stream inStrm by inserting a compiler directive of the form:

set inStrm InitialFIFOvalues value0 value1 . . .

in the body of the source module. This directive sets initial FIFO-values for inStrm to value0 value1 . . . .

Figure 5C:
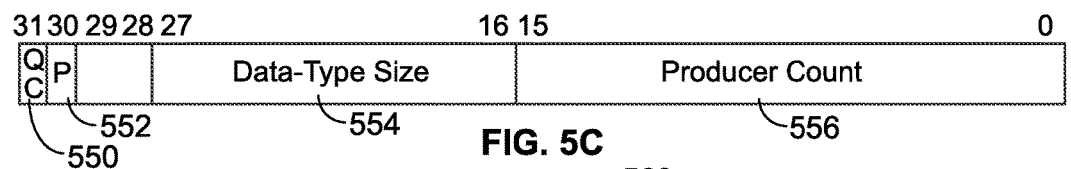
FIG. 5C is a diagram of the format of an output stream field in the object module in FIG. 5A.

FIG. 5C is a diagram of the output stream field 518 in FIG. 5A. The output stream field 518 includes a QC field 550, a ping field 552, a data-type size field 554 and a producer count field 556. The QC field 550 is a Boolean value indicating whether the stream is a regular or ping stream or a quasi-constant stream. A 0 (false) value indicates a regular or ping stream while a 1 (true) value indicates a quasi-constant stream.

The ping field 552 is a Boolean value indicating whether the stream is a ping type. A 0 (false) value indicates a non-ping stream while a 1 (true) value indicates a ping stream. If the ping field 552 is set to 1, then the data-type size field 554 is ignored since pings do not have values and there is therefore no need for the field.

The data-type size field 554 is a 12-bit unsigned integer indicating the size, in 32-bit words, of the stream's data type. The producer count field 556 is a 16-bit signed integer providing the initial value for a runtime producer count that is associated with a runtime version of the output stream in each runtime instance of the module. This runtime count, which is dynamic, indicates whether the output stream is ready. An output stream is ready if there are a sufficient number of slots in the destination FIFO queue(s) to accommodate the data values produced by an execution of the module instance. A negative runtime count (the sign bit is 1) indicates a sufficient number of slots. A non-negative runtime count (the sign bit is 0) indicates an insufficient number of slots. A count less than −1 thus reflects a surplus of slots, a non-negative count reflects a deficit of slots and a count of −1 reflects just enough slots. The default value is −2, but this value may be overridden for output stream outStrm by inserting a compiler directive of the form:

set outStrm ProducerCount pc in the body of the source module. This directive overrides the default and sets producer count for outStrm to pc.

Figure 5D:
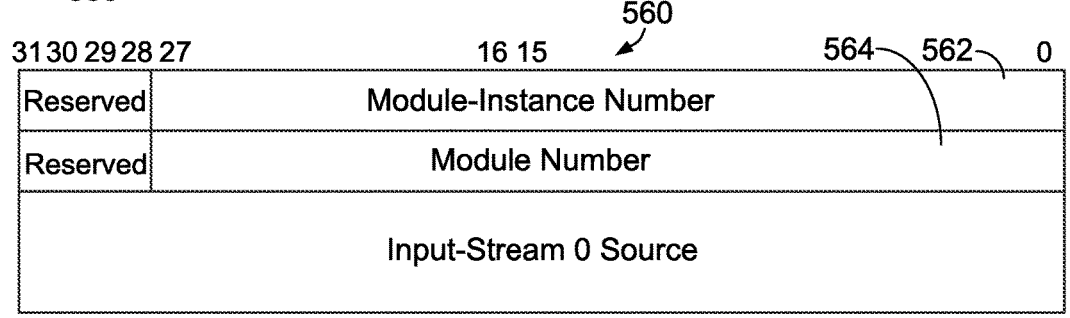
FIG. 5D is a diagram of an object module instance of the object in FIG. 5A.

FIG. 5D is a diagram of the format of an object module instance 560 which is the counterpart to a (source) module instance in Stream C. The object module instance 560 has a module instance number field 562, a module number field 564, a series of input-stream source fields 566, and a series of output-stream destination fields 568. The module-instance number field 562 is a 28-bit unsigned integer assigned by the compiler and uniquely identifying this object module instance 560 within the object code. The module number field 564 is a 28-bit unsigned integer identifying the object module (this instance's parent module) of which this structure is an instance.

The input stream source fields 566 are fields containing details about the source of each input stream of this module instance. The subfields comprising this field include an output stream number which is an 8-bit unsigned integer identifying the output stream of the object module instance that is the source of this input stream and a source module instance number which is a 28-bit unsigned integer identifying the object module instance that is the source of this input stream. The input-stream source fields 566 are omitted if the input-stream count field 506 of the parent module is 0.

The output-stream destination fields 568 are fields containing details about the destination of each output stream of this module instance. The output-stream destination fields contain a destination input stream number which is an 8-bit unsigned integer identifying the input stream of the object module instance that is the destination of this output stream and a destination module instance number which is a 28-bit unsigned integer identifying the object module instance that is the destination of this output stream. The output-stream destination fields 568 are omitted if the output-stream count field 508 of the parent module is 0.

Run-time data structures help coordinate, synchronize and schedule the tasks that comprise an application. There are eight types of run-time data structures, and six types of substructures. The run-time data structures include node parameters, task parameter lists (TPLs), TPL pointers tables, node consumer-counts tables (CCTs), node producer-counts tables (PCTs), node port-to-address translation tables (PTTs), node state information tables (SITs) and node ready-to-run queues. The task parameter lists include run-time input streams and run-time output streams substructures. The node consumer-counts tables include consumer counts substructures. The node producer-counts tables (PCTs) include producer counts substructures. The node port-to-address translation tables (PTTs) include input-port-FIFO write addresses substructures. The node state information tables (SITs) include task state information substructures.

Most of the data structures described below are associated with either node tasks or node ports, but there are a number of parameters (Node ID, execution unit ("EU") status, EU Task, EU general-purpose register, EU program counter and EU countdown timer) that are associated with the node as a whole. The node ID is a static 24-bit unsigned integer identifying the node number. The node ID may be poked (written) by the supervisor node only. The EU status parameter is a dynamic 2-bit unsigned integer indicating the current state of the node execution unit (EU). There are four EU states: 1) idle, where the EU is not currently running and there is no task set up on the EU; 2) stalled port, where a task has been set up on the EU, but the task is stalled because the task input/output ports are not currently ready; 3) stalled memory, where a task has been set up on the EU, but the task is stalled because it is waiting for a memory request to complete; and 4) running, where the EU is running (executing). The EU task parameter is a dynamic 4-bit unsigned integer specifying the number of the task currently set up on the execution unit. The EU task parameter is not relevant when EU status is idle. The EU general-purpose register parameters are eight 32-bit, general-purpose registers for use by the executing task. The EU program counter parameter is a dynamic 32-bit node-memory pointer to the address of the next instruction to be executed. The EU countdown timer parameter is a dynamic 32-bit unsigned integer that is decremented by 1 each clock cycle that a task is running (executing).

A task is the run-time embodiment of an object module instance and runs on a single node of the multi-node adaptive system such as the adaptive computing engine 100 in FIG. 1 or the adaptive computing machine 160 in FIG. 2. Most information associated with a task is contained in a task parameter list 600 shown in FIG. 6A which resides in node memory. The task parameter list 600 has an input stream count field 602, an output-stream count field 604, a duration field 606, an executable pointer field 608, a stack pointer field 610, a program counter field 612, a countdown time field 614, a series of general-purpose register fields 616, a series of input-stream fields 618, a series of output-stream fields 620 and a program variables field 622.

The input-stream count field 602 is a static 8-bit unsigned integer indicating the number of input streams of this task. The output-stream count field 604 is a static 8-bit unsigned integer indicating the number of output streams of this task. The duration field 606 is a static 32-bit unsigned integer indicating the number of execution-unit clock cycles each activation of this task is allowed to run before it times out. A value of 0 represents an infinite duration i.e., the task does not time out. The executable pointer field 608 is a static 32-bit node-memory pointer to the address of the task's executable code. The stack pointer field 610 is a static 32-bit node-memory pointer to the address of the task's stack. The program counter field 612 is a dynamic 32-bit node-memory pointer to the address of the next instruction in the task's main code to be executed. The countdown timer field 614 is the current of value of the task's 32-bit countdown timer. The initial value of the countdown timer field 614 is Duration. The countdown time field 614 initializes the node's EU countdown timer when the task is placed into execution.

The general-purpose register fields 616 are 32-bit contents of the execution-unit's general-purpose registers. The input stream fields 618 are fields containing details of each input stream of this module instance. The subfields in this field are described below with reference to FIG. 6B. The input-stream fields 618 are omitted if the input-stream count field 602 is 0. The output-stream fields 620 are fields containing details of each output stream of this module instance. The subfields comprising this field are described below with reference to FIG. 6C. The output-stream fields 620 are omitted if the output-stream count field 604 is 0. The program variables field 622 includes program variables of the task.

Figure 6A:
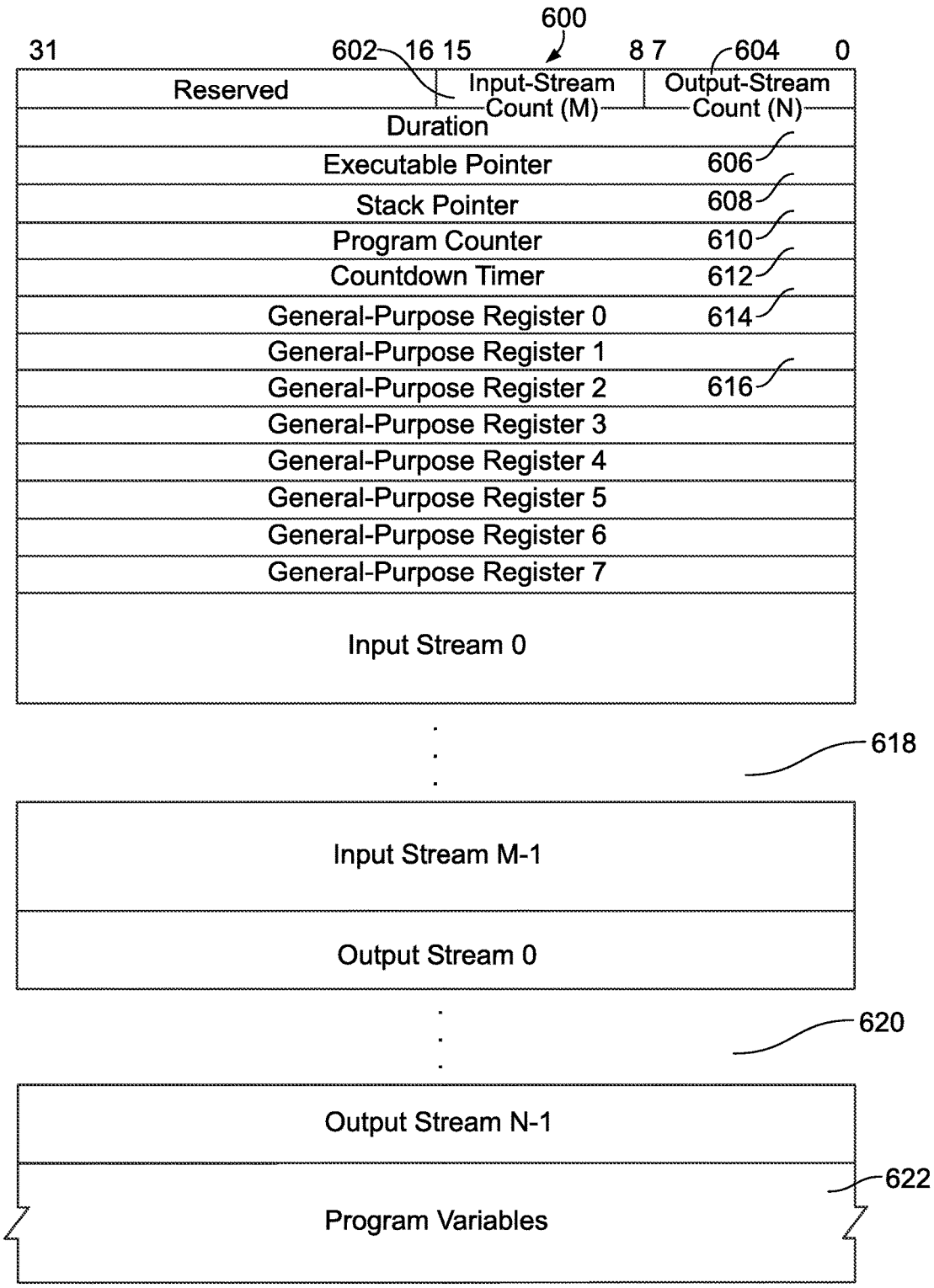
FIG. 6A is a diagram of a task parameter list used by a node.
Figure 6B:
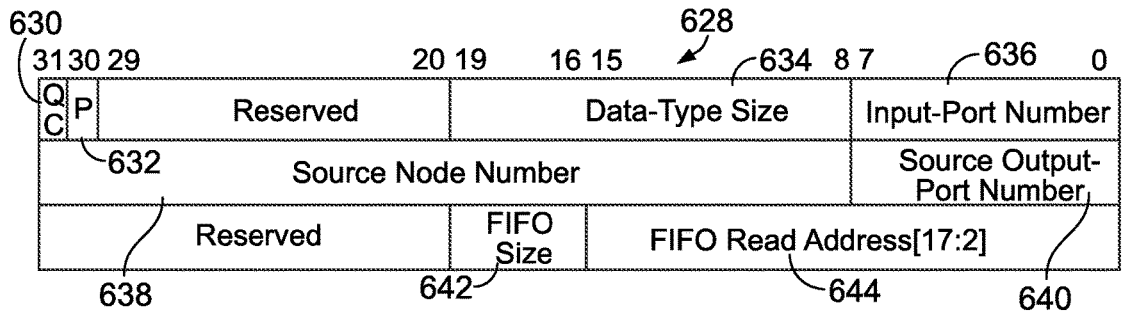
FIG. 6B is a diagram of the format of an input stream field in the task parameter list in FIG. 6A.

The input-stream field 618 of the task parameter list 600 is shown in FIG. 6B. The run-time input stream field 628 includes a QC field 630, a ping field 632, a data-type size field 634, an input port number field 636, a source node number field 638, a source output port number field 640, a FIFO size field 642 and a FIFO read address field 644. The QC field 630 is a static Boolean value indicating whether this stream is: (a) a regular or ping stream or (b) a quasi-constant stream. A 0 (false) value indicates a regular or ping stream while a 1 (true) value indicates a quasi-constant stream. The ping field 632 is a static Boolean value indicating whether this stream is of type pi ng. A 0 (false) value indicates a non-ping stream while a 1 (true) field indicates a ping stream. If the ping field is 1, the data-type size field 634, FIFO size field 642 and FIFO read address field 644 are all ignored since pings do not have values and there is therefore no need for the fields.

The data-type size field 634 is a 12-bit unsigned integer indicating the size, in 32-bit words, of the stream's data type. The input-port number field 636 is a static 8-bit unsigned integer identifying the node input port assigned by the linker/loader to this input stream. The source node number field 638 is a static 28-bit unsigned integer identifying the source node for this stream. The source output port number field 640 is a static 8-bit unsigned integer identifying the source output port assigned by the linker/loader to this stream. The FIFO size field 642 is a static 4-bit field encoding the size, in 32-bit words, of the input-stream's circular FIFO queue. The FIFO size is determined according to Table 1 referenced above. The FIFO read address field 644 is a dynamic 16-bit address indicating the location in node memory of the next data value in this input stream's FIFO queue.

Figure 6C:
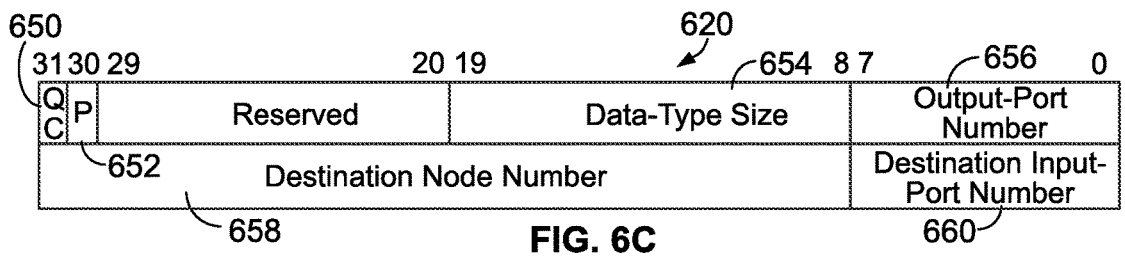
FIG. 6C is a diagram of the format of an output stream field in the task parameter list in FIG. 6A.

FIG. 6C shows the format of one of the output stream fields 620 in FIG. 6A. The output stream field 620 has a QC field 650, a ping field 652, a data type size field 654, an output port number field 656, a destination node number field 658, and a destination output port number field 660. The QC field 650 is a static Boolean value indicating whether this stream is: (a) a regular or ping stream; or (b) a quasi-constant stream. A 0 (false) value indicates a regular or ping stream while a 1 (true) value indicates a quasi-constant stream. The ping field 652 is a static Boolean value indicating whether this stream is of the type ping. A 0 (false) value indicates a non-ping stream while a 1 (true) field indicates a ping stream. If the ping field is 1, the data-type size field 654 is ignored since pings do not have values and there is therefore no need for the fields.

The data-type size field 654 is a 12-bit unsigned integer indicating the size, in 32-bit words, of the stream's data type. The input port number field 656 is a static 8-bit unsigned integer identifying the node output port assigned by the linker/loader to this output stream. The destination node number field 658 is a static 28-bit unsigned integer identifying the destination node for this stream. The destination output port number field 660 is a static 8-bit unsigned integer identifying the destination output port assigned by the linker/loader to this stream.

A node's runtime system accesses the task parameter lists of the various tasks running on the node by means of a TPL pointers table in the node. Each non-zero table entry in the TPL pointers table is a pointer to the address of a task parameter list located in node memory. The table may reside in the node wrapper (preferably) such as the node wrapper in FIG. 3 or in node memory.

To help provide flow control for data values flowing between tasks, a node's runtime system maintains a consumer-counts table (CCT) and a producer-counts table (PCT). There are 256 entries in each table, one for each node input port in the case of the CCT and one for each node output port in the case of the PCT in this example. The two tables may reside in the node wrapper (preferred) such as the node wrapper in FIG. 3 or in node memory.

Figure 6D:
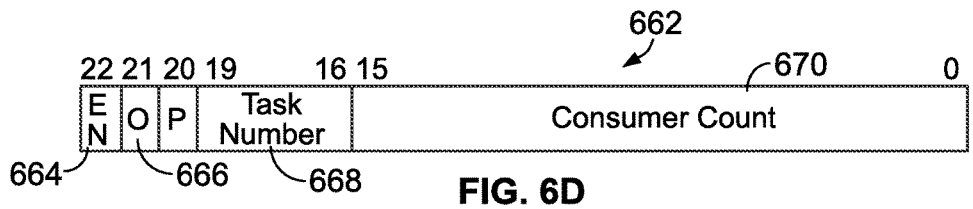
FIG. 6D is a diagram of the format of an entry in the consumer counts table for a regular stream associated with the task parameter list in FIG. 6A.
Figure 6E:
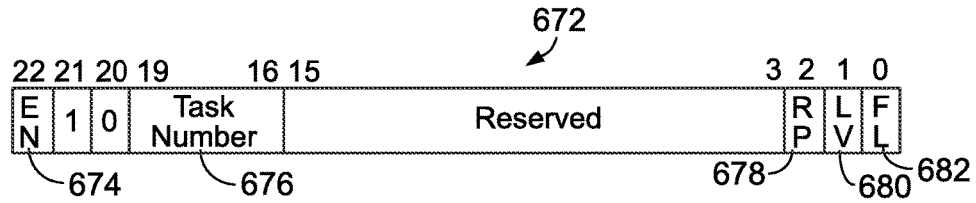
FIG. 6E is a diagram of the format of an entry in the consumer counts table for a quasi-constant stream associated with the task parameter list in FIG. 6A.

Each entry in the node consumer-counts table (CCT) has either a format for regular streams as shown in FIG. 6D or a format for quasi-constant streams as shown in FIG. 6E. FIG. 6D shows a CCT entry 662 for a regular stream. The CCT entry 662 for a regular steam includes an enable field 664, a ping field 666, a task number field 668 and a consumer count field 670. The enable field 664 is a static Boolean value indicating whether the port is enabled i.e., responding to data words and acknowledgements arriving on the inter-node network. A 0 (false) indicates a disabled port while a 1 (true) value indicates an enabled port. The ping field 666 is a static Boolean value indicating whether this stream is of type ping. A 0 (false) value indicates a non-ping stream while a 1 (true) field indicates aping stream. The task number field 668 is a static 4-bit unsigned integer indicating the number of the task to which the port is assigned. The consumer count field 670 is a dynamic 16-bit signed integer representing the input port's consumer count.

FIG. 6E shows a CCT entry 672 for a quasi-constant stream. The CCT entry 672 for a quasi-constant stream includes an enable field 674, a task number field 676, a task read position (RP) field 678, a latest data position (LV) field 680 and a flip (FL) field 682. The enable field 674 and task number field 676 are identical to their counterparts in FIG.

6D. The task read position field 678 is a dynamic Boolean value indicating the upper or lower position in the port's FIFO queue from which the task denoted in the task number field 676 is currently reading (when it reads). A 0 (false) value indicates that the task is reading from the lower position while a 1 (true) value indicates that the task is reading from the upper position. The latest data position field 680 is a dynamic Boolean value indicating the upper or lower position in the port's FIFO queue from which the latest data value currently resides. A 0 (false) value indicates that latest value is in the lower position while a 1 (true) value indicates that the latest value is in the upper position. The flip field 682 is a dynamic Boolean value indicating whether the task position field 678 has been flipped, from lower to upper, or vice versa. The flip field 682 is set to 1 when a flip occurs, and reset to 0 when a pair of backward acknowledgements (both with an ack value of −1) are sent, one to the stream source and the other to the port itself (a self ack). The first acknowledgement notifies the stream source that space has freed up in the port's FIFO queue for the next data value. The second acknowledgement resets the flip field bit in the consumer count.

Figure 6F:
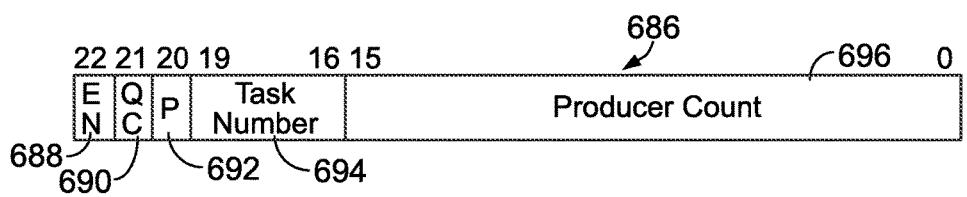
FIG. 6F is a diagram of the format of an entry in the producer counts table for a stream associated with the task parameter list in FIG. 6A.

FIG. 6F shows a table entry 686 of a node producer count table (PCT). The table entry includes an enable field 688, a QC field 690, a ping field 692, a task number field 694 and a producer count field 696. The enable field 688 is a static Boolean value indicating whether the port is enabled i.e., responding to data words and acknowledgements arriving on the inter-node network. A 0 (false) indicates a disabled port while a 1 (true) value indicates an enabled port. The QC field 690 is a static Boolean value indicating whether this stream is: (a) a regular or ping stream or (b) a quasi-constant stream. A 0 (false) value indicates a regular or ping stream while a 1 (true) value indicates a quasi-constant stream. The ping field 692 is a static Boolean value indicating whether this stream is of type ping. A 0 (false) value indicates a non-ping stream while a 1 (true) field indicates a ping stream. The task number field 694 is a static 4-bit unsigned integer indicating the number of the task to which the port is assigned. The producer count field 696 is a dynamic 16-bit signed integer representing the output port's producer count.

The port-to-address translation table of a node defines the size and location in node memory of each input port's FIFO queue. It also provides a write pointer for each FIFO queue, which is used to write the payload of each incoming data word directed at the associated input port into the next location in the circular queue. Read pointers are maintained by tasks. The port-to-address translation table, which may reside either in the node wrapper (preferred) or in the general-purpose node memory, has 64 entries, one for each node input port.

There are two fields in each port-to-address translation table (PTT) entry, a FIFO size field and a FIFO write address field. The FIFO size field is a static 4-bit field encoding the size, in 32-bit words, of the input-port's circular FIFO queue as shown in Table 1 above. The FIFO write address is a dynamic 16-bit address indicating where the next incoming 32-bit datum on this input port is to be written. Since input-FIFO read and write addresses must fall on 32-bit, i.e., 4-byte boundaries, the two low-order address bits are always 0 and are therefore, omitted from the FIFO write address field.

The runtime system of a node schedules tasks with the aid of a state information table (SIT). The state information table may reside either in the node wrapper or in node memory and has 16 entries, one for each potential task. Each entry in the SIT has a status field, an inputs read count and an outputs ready count. The status field is a dynamic 2-bit field indicating the current state of the task. There are four task states: 1) suspend, indicating the task is suspended and not responding to events; 2) idle, indicating the task is responding to events but is not yet ready to run; 3) ready, indicating the task is ready to run and is in the node ready-to-run queue; and 4) running, indicating the task is running (executing).

The inputs ready count field is a dynamic 9-bit signed integer indicating whether the current number of ready input ports, which are task input ports with non-negative consumer counts, are sufficient for the task to run (execute). A negative count (the sign bit is 1) indicates that there are an insufficient number of ready input ports. A non-negative count (the sign bit is 0) indicates that there are a sufficient number of ready input ports. The outputs ready count field is a dynamic 9-bit signed integer indicating whether the current number of ready output ports (task output ports with negative producer counts) is sufficient for the task to run (execute). A negative count (the sign bit is 1) indicates that there are an insufficient number of ready output ports. A non-negative count (the sign bit is 0) indicates that there are a sufficient number of ready output ports. When a task's inputs ready count and outputs ready count are both non-negative (both sign bits are 0), the task is ready to run.

Each processing node has a ready-to-run queue which is a circular FIFO queue containing the numbers of those tasks that are ready to run (execute). It has a capacity of 16 task numbers and may reside either in the node wrapper or in general-purpose node memory. The ready-to-run queue is accessed via a write pointer and a read pointer. The node's runtime system places a task on the queue when the task's input ready count and output ready count both become non-negative (both sign bits become 0).

Figure 7:
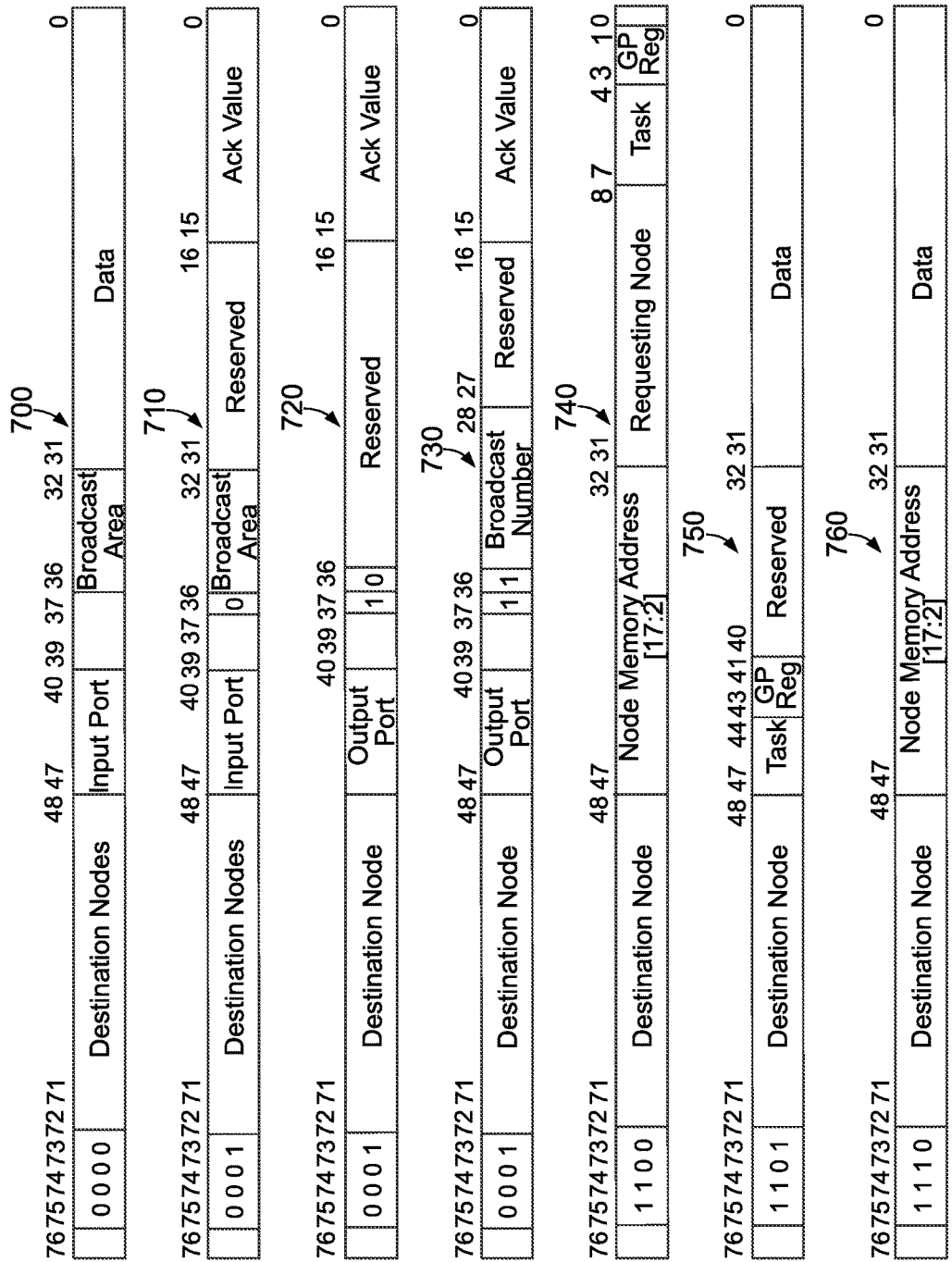
FIG. 7 shows network words used by the nodes executing a stream based program.

Network words carried over the inter-node network of the target architecture, such as the adaptive computing engine 100 in FIG. 1, are the means by which data values are conveyed between tasks and the means by which tasks are synchronized and coordinated. Example network words are shown in FIG. 7 and include a data word 700, a forward acknowledgment word 710, a backward acknowledgment (point to point) word 720, backward acknowledgement (broadcast) word 730, a memory-random-access (MRA) read word 740, a memory-random-access (MRA) read data word 750 and a memory-random-access (MRA) write word 760.

Data words such as the data word 700 convey a whole or partial data value from an output port of a source node (an output stream of a source task) to input ports of one or more destination nodes (input streams of one or more destination tasks). Each data word includes a destination node field, an input port field, a broadcast area field and a data field.

The destination node field is a 24-bit unsigned integer indicating the number(s) of the destination node(s) of the data word 700. If BA denotes the value in the broadcast area field, then the high-order (24−BA) bits of the destination node field are care bits (bits that are fixed for all destination nodes), while the low-order BA bits are don't-care bits (bits that can be either 0 or 1). So, for example, if BA=17, then the high-order 7 bits of the destination node field determine the high-order 7 bits of the node number for all destination nodes, while the low-order 17 bits can be either 0 or 1.

The input port field is an 8-bit unsigned integer indicating the number, n, of the node input port to which the data word is directed. When the data word is broadcast to multiple nodes and there are unintended recipients among those nodes, input port n on each such node is disabled (by setting its enabled bit to 0). The broadcast area field is a 4-bit unsigned integer indicating the number of low-order, don't-care bits in the destination node field. This number determines the number of nodes to which the data is broadcast as shown in TABLE 2:

| Broadcast Area (Number of Low-Order Don't-Care Bits in Destination-Node Field) | Number of Nodes Receiving Data Word |
| --- | --- |
| 0 | 1 |
| 1 | 2 |
| 2 | 4 |
| 3 | 8 |
| 4 | 16 |
| 5 | 32 |
| 6 | 64 |
| 7 | 128 |
| 8 | 256 |
| 9 | 512 |
| 10 | 1,024 |
| 11 | 2,048 |
| 12 | 4,096 |
| 13 | 8,192 |
| 14 | 16,384 |
| 15 | 32,768 |
| 16 | 65,536 |
| 17 | 131,072 |
| 18 | 262,144 |
| 19 | 524,288 |
| 20 | 1,048,576 |
| 21 | 2,097,152 |
| 22 | 4,194,304 |
| 23 | 8,388,608 |
| 24 | 16,777,216 |

When the broadcast area field is zero, the data word is broadcast to just one node. This special case represents a point-to-point transfer.

The data field is the 32-bit payload of the data word 700. The data field contains an entire data value if the data-type size is 32 bits or less and a partial data value if the data-type size is greater than 32 bits. Upon arrival of the data word 700 at a destination node, the 32-bit payload is written into the FIFO queue of the specified input port.

One or more data words are sent in response to each statement of the form
  strm<<expr;
appearing in the source code, where strm is a stream and expr is an expression of a matching data type. This thread-domain statement causes expr to be evaluated and the resulting value sent via the data field of one or more data words to the node(s) and input port assigned by the linker/loader to the destination(s) of strm.

The forward acknowledgment word 710 together with backward acknowledgement words such as backward acknowledgement words 720 and 730 help provide flow control for data words such as the data word 700. This control insures that input FIFO queues never overflow (have data written into them when they are full) or underflow (have data read from them when they are empty). A task sends a forward acknowledgement word 710 after the task produces (sends) data via a task output port. In this case, the task sends the acknowledgement to the destination input port that receives the data that is produced. A task also sends a forward acknowledgement word 710 when the task consumes data from the FIFO queue of a task input port. In this case, the task sends the acknowledgement to that same input port (and so is called a self acknowledgement).

The forward acknowledgement word 710 includes a destination node field, an input word field, a broadcast area field and an acknowledgement value field. The destination node field is a 24-bit unsigned integer indicating the number(s) of the destination node(s) of the forward acknowledgement word 710. If BA denotes the value in the broadcast area field, then the high-order (24−BA) bits of the destination node field are care bits (bits that are fixed for all destination nodes), while the low-order BA bits are don't-care bits (bits that can be either 0 or 1). For example, if BA=13, then the high-order 11 bits of the destination node field determine the high-order 11 bits of the node number for all destination nodes, while the low-order 13 bits can be either 0 or 1.

The input port field is an 8-bit unsigned integer indicating the number, n, of the node input port to which the forward acknowledgement is directed. When the forward acknowledgement word 710 is broadcast to multiple nodes and there are unintended recipients among those nodes, input port n on each such node is disabled (by setting its enable bit to 0). The broadcast area field is a 4-bit unsigned integer indicating the number of low-order, don't-care bits in the destination node field. The acknowledge value field is a 16-bit signed integer. Upon arrival of the forward acknowledgement word 710 at the destination node, the acknowledgement value is added to the consumer count of the destination input port except when the input port is a quasi-constant port.

A forward acknowledgement word is sent each time a source-code statement of the form
  strm<<ForwardAck(expr);
where strm is a stream and expr is an integer expression, is executed. This thread-domain statement causes expr to be evaluated and the resulting integer included as the acknowledgement value in a forward acknowledgement sent to the node(s) and input port assigned by the linker/loader to the destination(s) of s t rm.

For the special case where strm is a quasi-constant stream, there are restrictions on when forward (and backward) acknowledgements are sent. They are sent only as part of the following repeating pattern:

1. The stream source sends a data value via a statement of the form
   strm<<expr;
2. The stream source sends a forward acknowledgement via a statement of the form
   strm<<Forwardck(1);
3. Each stream destination sends a backward acknowledgement via a statement of the form
   strm<<BackwardAck (−1);

These separate backward acknowledgements are combined in the switching nodes of the inter-node network into a single backward acknowledgement that is delivered to the stream source. This pattern, which is strictly adhered to by quasi-constant streams, and is fairly typical of regular streams may be represented diagrammatically as follows:

| Stream source | --- Data Value --> | Stream destination(s) |
| --- | --- | --- |
| Stream source | --- Forward Acknowledgement --> | Stream destination(s) |
| Stream source | <-- Backward Acknowledgement --- | Stream destination(s) |
| Stream source | --- Data Value --> | Stream destination(s) |
| Stream source | --- Forward Acknowledgement --> | Stream destination(s) |
| Stream source | <-- Backward Acknowledgement --- | Stream destination(s) |

Backward acknowledgement words such as the words 720 and 730 help provide flow control for data words such as the data word 700. This control insures that input FIFO queues will never overflow (have data written into them when they are full) or underflow (have data read from them when they are empty). A task sends a backward acknowledgement after the task consumes data from the FIFO queue of a task input port. In this case, the task sends the acknowledgement to the source output port that produced the data that was consumed. A task also sends backward acknowledgement after the task produces (sends) data via a task output port. In this case, the task sends the acknowledgement to that same output port (and so is called a self acknowledgement).

There are two forms of backwards acknowledgements words, the backwards acknowledgement word for point-to-point streams such as the word 720 and those for broadcast (non-point-to-point) streams such as the word 730 in FIG. 7. There are three variable fields, destination node, output port and acknowledgement value fields, that are common to both backward words 720 and 730. A broadcast number field is unique to the broadcast backward word 730. The destination node field is a 24-bit unsigned integer indicating the number of the destination node (which is actually the stream source) of the backward acknowledgement. The output port field is an 8-bit unsigned integer indicating the number of the node output port to which the backward acknowledgement is directed. The broadcast number field is an 8-bit unsigned integer assigned to each broadcast (non-point-to-point) stream. The broadcast number field is used to identify backward acknowledgements belonging to the same stream as they arrive at a switching node of the inter-node network from different processing nodes in the stream's broadcast area. The switching node combines those related acknowledgements into a single acknowledgement that is passed on to the next switching node.

The acknowledgement value field is a 16-bit signed integer. Upon arrival of the backward acknowledgement word at the destination node, the acknowledgement value field is added to the producer count of the destination output port except when the output port is a quasi-constant port. Concurrent backward acknowledgements belonging to the same broadcast stream must have the same ack value. Failure to comply with this requirement will result in an undefined value being delivered to the stream source. One or more backward acknowledgements are sent in response to each statement of the form:

strm<<BackwardAck(expr);

appearing in the source code, where strm is a stream and expr is an integer expression. This thread-domain statement causes expr to be evaluated and the resulting integer included as the acknowledgement value field in a backward acknowledgement word sent to the node and output port of each source of strm.

The program, however, must be structured in such a way that the backward acknowledgement words for a quasi-constant stream are sent only as part of the data-word/forward-ack/backward-ack pattern described in the preceding section. Also, two backward acknowledgement words from the same node and belonging to the same broadcast (non-point-to-point) stream (and thus having the same broadcast number) are never in transit on the inter-node network simultaneously. This may be ensured by adopting the data-word/forward-ack/backward-ack pattern described above. Finally, backward acknowledgement words in transit on the inter-node network simultaneously and belonging to the same broadcast (non-point-to-point) stream (and thus having the same broadcast number) have the same acknowledgement value.

A memory-random-access (MRA) read word such as the MRA read word 740 in FIG. 7, is a request to a destination node to read a 32-bit datum from that node's local memory and return it to the requester. Each MRA read word 740 has a destination node field, a node memory address field, a requesting node field, a task node and a general purpose register field. The destination node field is a 24-bit unsigned integer indicating the number of the destination node of the MRA read word. The destination node field data is obtained from the high-order 24 bits of the 40-bit memory address passed to the requesting node's runtime system by the requesting node's execution unit. The node memory address field is a 16-bit, 32-bit-word (4-byte-word) address in the destination node's local memory from which the 32-bit datum is to be read. The node memory address is obtained from the low-order 16 bits of the 40-bit memory address passed to the requesting node's runtime system by the requesting node's execution unit. The requesting node field is a 24-bit unsigned integer indicating the number of the node to which the 32-bit datum is to be returned. The requesting node field data is obtained from the requesting node's node ID register. The task field is a 4-bit unsigned integer indicating the number of the requesting task and is obtained from the requesting node's EU task register. The general purpose register field is a 3-bit unsigned integer indicating the number of the general-purpose register of the requesting task in which the read data is to be stored and is obtained from the requesting node's execution unit. A node's runtime system automatically generates an MRA read word 740 whenever the node execution unit encounters an instruction requiring a memory read from a location beyond local node memory.

The memory-random-access (MRA) read data word 750 in FIG. 7 returns the 32-bit datum obtained in response to a MRA read word such as the MRA read word 740 issued by a requesting node/task. The MRA read data word 750 includes a destination node field, a task field, a general purpose register field and a data field. The destination node field is a 24-bit unsigned integer indicating the number of the requesting node and is obtained from the requesting node field of a MRA read word 740. The task field is a 4-bit unsigned integer indicating the number of the requesting task and is obtained from the task field of a MRA read word 740. The general purpose register field is a 3-bit unsigned integer indicating the number of the general-purpose register of the requesting task in which the read data is to be stored and is obtained from the general purpose register field of a MRA read word such as the MRA read word 740 in FIG. 7. The data field is the 32-bit datum being returned by the MRA read data word 750 and is obtained from performing a MRA read word. A node's runtime system automatically generates a MRA read data word 750 in response to a MRA read word 740.

The memory-random-access (MRA) write word 760 is a request to a destination node to write a 32-bit datum into that node's local memory. The MRA write word 760 includes a destination node field, a node memory address field and a data field. The destination node field is a 24-bit unsigned integer indicating the number of the destination node of the MRA write word 760. The destination node field is obtained from the high-order 24 bits of the 40-bit memory address passed to the requesting node's runtime system by the requesting node's execution unit. The node memory address field is a 16-bit, 32-bit-word (4-byte-word) address in the destination node's local memory to which the 32-bit datum in the data field is to be written. The node memory address is obtained from the low-order 16 bits of the 40-bit memory address passed to the requesting node's runtime system by the requesting node's execution unit. The data field is the 32-bit datum to be written and is passed to the requesting node's runtime system by the requesting node's execution unit. A node's runtime system automatically generates an MRA write word 760 whenever the node execution unit encounters an instruction requiring a memory write to a location beyond local node memory.

Stream Compiler

As explained above, the stream compiler accepts a stream C source program having variable declarations, stream declarations, function declarations, definitions and calls, and source module declarations, definitions and instances. The compiler produces an object program having object modules and object module instances as in steps 404, 406 and 408 in FIG. 4A.

FIG. 4B is a flow diagram shows the preprocessor step (404) in FIG. 4A. Specifically, expanding the module array instances (430) results in each instantiation of a module array in the source program being expanded into an array of module instances. Thus each element (module instance) of the instantiated array becomes a separate module instance after expansion. These separate module instances operate concurrently.

A module array typically has exactly one output stream per module. That means that each instantiation of the array has n separate output streams, where n is the number of elements (module instances) of the instantiated array. These outputs streams are typically combined into a single stream using one of the following (associative and commutative) C operators:

a. || (Logical OR)
b. && (Logical AND)
c. | (Bitwise OR)
d. & (Bitwise AND)
e. ^ (Bitwise exclusive OR)
f. + (Arithmetic sum)
g. * (Arithmetic product)

This joining of array output streams into a single stream is accomplished using the notation:

<operator>(<instantiated module array>)

An example of the expansion of module array instances includes a two-dimensional module array, doPixel[ ][ ] shown below:

```
stream ping doPixel[i][j](int* inStrm1, int* inStrm2)
{                              // The indices, i and j,
    int* image1;               // allow each instance of
    int* image2;               // doPixel to be personalized
    int newPixel;
    inStrm1 >> image1;         // Get old image pointer
    inStrm2 >> image2;         // Get new image pointer
        .                      // Compute newPixel from
        .                      //   pixels in neighborhood
        .                      //   of inImage[i][j]
    image2[i][j] = newPixel;   // Update image2
    out << ping;               // Singal completion
}
```

Although the number of dimensions of the doPixel[ ][ ] module array (2) is specified, the size of each dimension is not. The size of each dimension is specified in each instantiation of doPixel[ ][ ], as illustrated in the following definition of the module, process.

```
stream ping process(int* inStrm1, int* inStrm2)
{
    stream ping sync;
    sync = &&(doPixel[2][3]((sync = ping) && inStrm1, inStrm2));
    out = sync;
}
```

Here, doPixel[ ][ ] is instantiated as a 2×3 array of doPixel[ ][ ] module instances, each having a specific pair of indices. Expanding doPixel[2][3] makes these module instances explicit:

```
stream ping process(int* inStrm1, int* inStrm2)
{
    stream ping sync;
    sync = doPixel[0][0]((sync = ping) && inStrm1, inStrm2)
        &&
        doPixel[0][1]((sync = ping) && inStrm1, inStrm2)
        &&
        doPixel[0][2]((sync = ping) && inStrm1, inStrm2)
        &&
        doPixel[1][0]((sync = ping) && inStrm1, inStrm2)
        &&
        doPixel[1][1]((sync = ping) && inStrm1, inStrm2)
        &&
        doPixel[1][2]((sync = ping) && inStrm1, inStrm2) ;
    out = sync;
}
```

This expanded form of the process module shows the six concurrent elements of the doPixel[2][3] module-array instantiation, each with its own pair of indices, and it shows the six ping output streams of these instances being combined into a single ping stream via the && operator.

Returning to FIG. 4B, the flattening the module hierarchy (432) is performed so each module encapsulates just one of the following primitives: 1) an operation in a stream expression; 2) a function call in a stream expression; 3) a module whose body contains thread-domain code; and 4) a module whose body is defined externally.

Figure 8A:
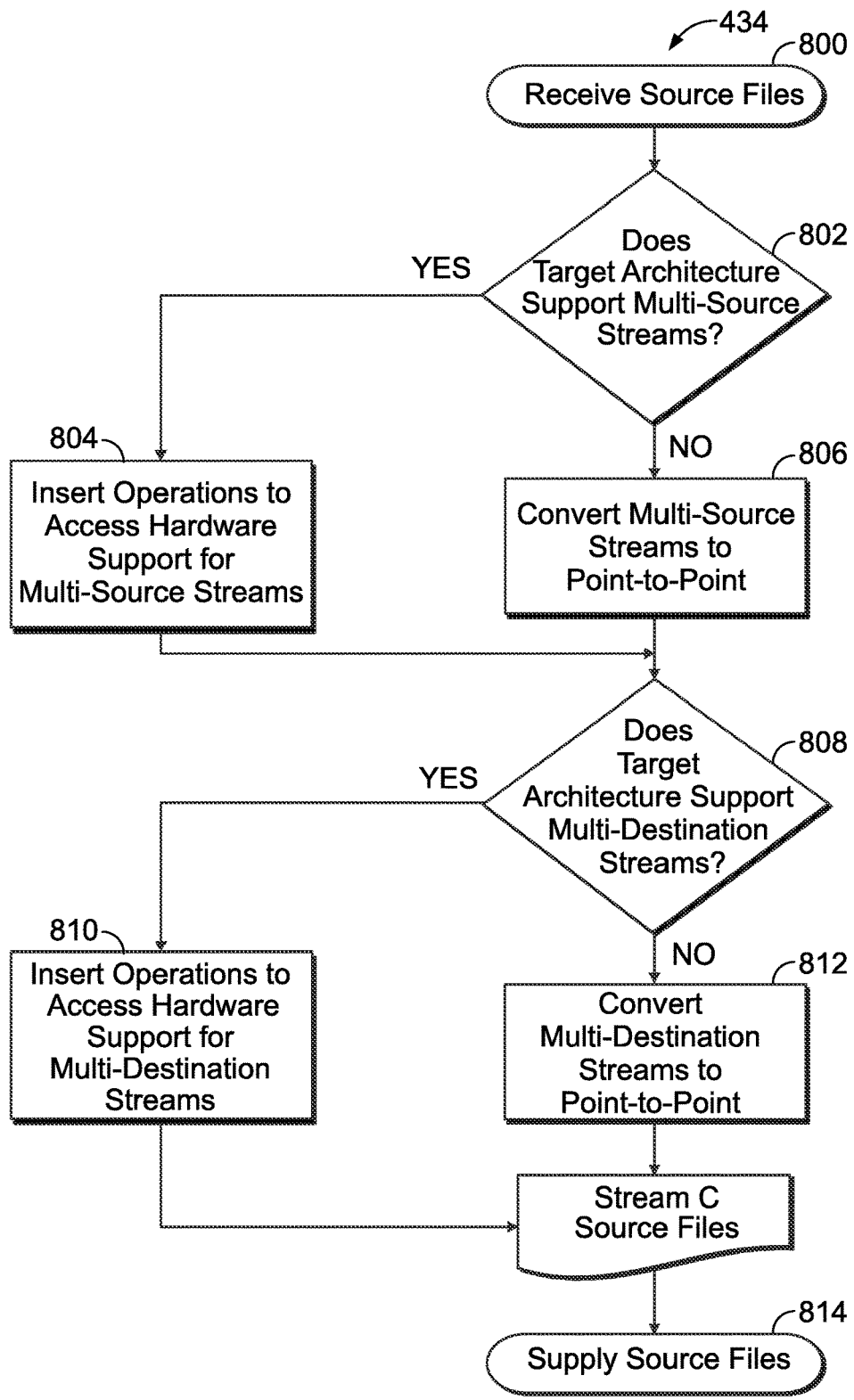
FIG. 8A is a flow diagram of the process of converting multi-source and multi-destination streams to point-to-point streams.

FIG. 8A is a flow diagram of the process of converting multi-source and multi-destination streams (434) in FIG. 4B. The target architecture of a Stream C program may, or may not, support multi-source streams. Similarly, it may, or may not, support multi-destination streams. The purpose of converting multi-source and multi-destination streams (434) is to adapt Stream C code involving multi-source and multi-destination streams to the capabilities of the target architecture.

The source files are received by the conversion subroutine (800). The subroutine determines whether the target architecture supports multi-source streams (802). If the target supports multi-source streams, the subroutines inserts operations to access hardware support for the multi-source streams (804). If the target does not support multi-source streams, the subroutine converts the multi-source streams to point-to-point (806).

A multi-source stream is converted to multiple point-to-point streams by inserting a merge-module instance at each destination of the multi-source stream. This module has a separate point-to-point input stream for each source of the multi-source stream.

The conversion of a multi-source stream, where n is the number of sources, to point-to-point streams involves creating a new merge module or using an existing merge module that has n input streams and a single output stream, all with the same data type as the multi-source stream. Each value arriving on one of the n input streams of the module is passed to the single output stream of the module. The merge module ensures that values arriving on the same input stream of the module are passed to the output stream of the module in the same order as their arrival. The n input streams are serviced in a fair and equitable manner such as in a circular round-robin fashion. An instance of the merge module is created. The n sources of the multi-source stream are connected to n separate inputs of the merge-module instance via n entirely new streams. The multiple sources of the multi-source input stream are replaced with the output stream of the merge module instance. The initial values that may be in the FIFO queue of the input stream are preserved. Any dangling streams (those without both a source and a destination) are then deleted.

An example of a module that merges four integer streams is:

The subroutine then determines whether the target architecture supports multi-destination streams (808). If the target architecture supports multi-destination streams, the subroutine inserts operations to access hardware support for multi-destination streams (810). If the target architecture does not support multi-destination streams, the subroutine converts the multi-destination streams to a point-to-point stream (812). The source files are then supplied (814).

A multi-destination stream is converted to multiple point-to-point streams (812) by inserting a fanout module instance at each source of the multi-destination stream. This module has a separate point-to-point output stream for each destination of the multi-destination stream. The conversion of each of the multi-destination output streams, where n is the number of stream destinations, to multiple point-to-point streams involves creating a new fanout module or using an existing fanout module that has n output streams and a single input stream, all with the same data type as the multi-destination stream. Each value arriving on the input stream of the module is passed to each output stream of the module. The fanout module ensures that values arriving on the input stream of the module are passed to all output streams of the module in the same order as their arrival. An instance of the fanout module is created. The n destinations of the multi-destination stream are connected to the output of the fanout module instance via n entirely new streams. The multiple destinations of the multi-destination output stream of the stream expression are replaced with the input stream of the fanout module instance. The initial values that may be in the FIFO queue of the input stream are preserved. Any dangling streams (those without both a source and a destination) are then deleted.

```
stream int merge(int inStrm[4])         // 4-input merge module
{
    #set InputsReadyCount -1            // Initialize the module's Inputs Ready Count
    for (int i = 0; i < 4; i++)         // Check each of the four input streams
    {
        int count = 0;
        while ((inStrm[i].ConsumerCount >= 0) && (OutputsReadyCount >= 0))
        {
            int varx;                           // Declare variable
            inStrm[i] >> varx;                  // Get next: value from inStrm[i]
            inStrm[i] << ForwardAck(-1);        // Do self ack on input stream
            out << varx;                        // Put value into output stream
            out << BackwardAck(+1);             // Do self ack on output stream
            ++count;                            // Increment count of values transferred
        }
        if (count > 0)                          // Send acks if values have been transferred
        {
            inStrm[i] << BackwardAck(-count);   // Send backward ack to source of inStrm[i]
            out << ForwardAck(+count);          // Send forward ack to destination of out
        }
    }
}
```

An example of a module for fanning out four integer streams is:

```
stream int merge(int inStrm[4])            // 4-input merge module
{
    #set InputsReadyCount -1               // Initialize the module's Inputs Ready Count
    for (int i = 0; i < 4; i++)            // Check each of the four input streams
    {
        int count = 0;
        while ((inStrm[i].ConsumerCount >= 0) && (OutputsReadyCount >= 0))
        {
            int varx;                      // Declare variable
            inStrm[i] >> varx;             // Get next value from inStrm[i]
            inStrm[i] << ForwardAck(-1);   // Do self ack on input stream
            out << varx;                   // Put value into output stream
            out << BackwardAck(+1);        // Do self ack on output stream
            ++count;                       // Increment: count of values transferred
        }
        if (count > 0)                     // Send acks if values have been transferred
        {
            inStrm[i] << BackwardAck(-count);  // Send backward ack to source of inStrm[i]
            out << ForwardAck(+count);         // Send forward ack to destination of out
        }
    }
}
```

An alternate process for converting a multi-destination stream to multiple point-to-point streams (812) involves a parent module. The conversion of each of the multi-destination output streams to multiple point-to-point streams involves creating a new parent module or using an existing module as the parent of the module instance that is identical to the original parent of the module instance except that the module output stream associated with the multi-destination stream is replaced with n output streams, each with the same data type as the original output stream. Also each stream operation involving the original output stream is replaced with n copies of the operation so that there is a separate copy of the operation for each of the n newly created output streams. The module instance is updated to reflect the newly added output streams. The original multi-destination stream is replaced with n streams, each connecting a separate output stream of the newly updated module instance to a separate destination among the destinations of the original multi-destination stream. Any dangling streams (those without both a source and a destination) are then deleted.

Conversion of stream expressions (436) in FIG. 4B involves replacing a hierarchy of operations and function calls with a hierarchy of module instances. In Stream C, there are three basic structures that perform actual computations: 1) operations appearing in stream expressions; 2) function calls appearing in stream expressions; and 3) thread-domain code appearing in module bodies. The hierarchy of module instances is a single construct for expressing computations, each module instance containing only thread-domain code.

Operations appearing in one or more stream expressions and functions called from one or more stream expressions are each assigned a separate source module. The separate source module, which may be new or existing, has an ordered sequence of inputs of the operation or function and a single output stream with the same type as the output of the operation or function. The thread-domain code is assigned to each module. The thread-domain code contains code that consumes a single value from each module input stream and supplies those values in order to an instance of the operation or a call to the function. The thread-domain code puts the value resulting from the operation or function call into the module output stream, sends a backward acknowledgement such as a backward acknowledgement 720 shown in FIG. 7 with an ack value of −1 to the source of each input stream from which a value was consumed and a forward acknowledgement with an ack value of −1 such as forward acknowledgement 710 shown in FIG. 7 to each input stream from which a value was consumed. The thread-domain module also contains code that sends a forward acknowledgement with an ack value of +1 to the destination of the module's output stream and sends a backward acknowledgement with an ack value of +1 to the module's output stream. The hierarchy of operations and function calls in each stream expression is replaced with a hierarchy that is identical except that each operation or function call is replaced by an instance of the module assigned to it.

Figure 8B:
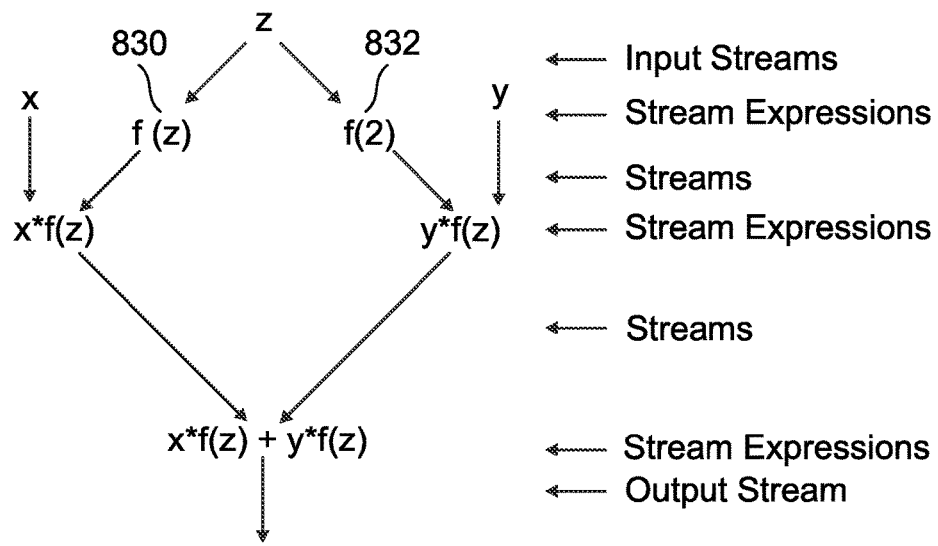
FIGS. 8B-8C are hierarchical diagrams illustrating the process of converting a stream expression to a hierarchy of operations and function calls.

FIG. 8B is an illustration of the following example of converting a stream expression in which x, y and z are integer streams and f is a function:

$$x*f(z)+y*f(z)$$

In this expression, there are three operations, a sum and two multiplies, and two function calls, both involving function f. Under the usual rules of operator precedence, the expression has the hierarchy of operations and function calls as shown in branches 830 and 832 in FIG. 8B.

The assignment of a separate source module to each function and operation results in three modules such as:

```
stream int callf(int z)              // Call-function-f module
{
    int count = 0;
    do
    {
        int varz;                    // Declare variable
        z >> varz;                   // Get next value from input stream z
        z << ForwardAck(-1);         // Do self ask on input stream z
        out << f(varz);              // Call function and put returned value
into output stream
        out << BackwardAck(+1);      // Do self ask on output stream
        ++count;                     // Increment count of function calls
    } while ((InputsReadyCount >= 0) && (OutputsReadyCount >= 0));
    if (count > 0)                   // Send acks if function called
    {
        z << BackwardAck(-count);    // Send backward ask to source of input
stream z
        out << ForwardAck(+count);   // Send forward ack to destination of
output stream
    }
}
stream int mult(int u, int v)        // Integer-multiply module
{
    int count = 0;
    do
    {
        int varu, varv;              // Declare variables
        u >> varu;                   // Get next value from input stream u
        u << ForwardAck(-1);         // Do self ack on input stream u
        v >> varv;                   // Get next value from input stream v
        v << ForwardAck(-1);         // Do self ack on input stream v
        out << varu*varv;            // Perform operation and put result into output
stream
        out << BackwardAck(+1);      // Do self ack on output stream
        ++count;                     // Increment count of operations performed
    } while ((InputsReadyCount >= 0) && (OutputsReadyCount >= 0));
    if (count > 0)                   // Send acks if operation(s) performed
    {
        u << BackwardAck(-count);    // Send backward ack to source of input stream u
        v << BackwardAck(-count);    // Send backward ack to source of input stream v
        out << ForwardAck(+count);   // Send forward ack to destination of output
stream
    }
}
stream int sum(int u, int v)         // Integer-sum module
{
    int count = 0;
    do
    {
        int varu, varv;              // Declare variables
        u >> varu;                   // Get next value from input stream u
        u << ForwardAck(-1);         // Do self ack on input stream u
        v >> varv;                   // Get next value from input stream v
        v << ForwardAck(-1);         // Do self ack on input stream v
        out << varu + varv;          // Perform operation and put result into output
stream
        out << BackwardAck(+1);      // Do self ack on output stream
        ++count;                     // Increment count of operations performed
    } while ((InputsReadyCount >= 0) && (OutputsReadyCount >= 0));
    if (count > 0)                   // Send acks if operation(s) performed
    {
        u << BackwardAck(-count);    // Send backward ack to source of input stream u
        v << BackwardAck(-count);    // Send backward ack to source of input stream v
        out << ForwardAck(+count);   // Send forward ack to destination of output
stream
    }
}
```

Figure 8C:
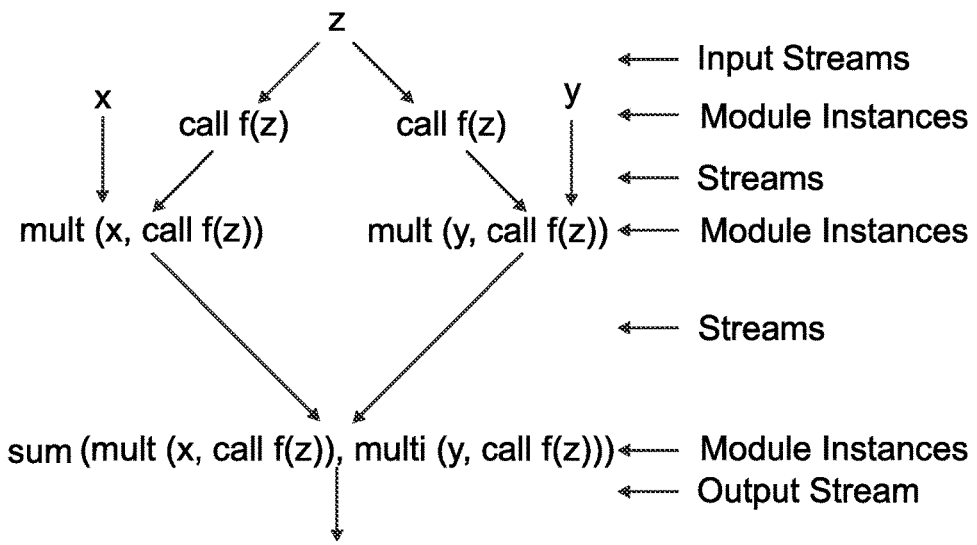

In this example, replacing the hierarchy of operations and function calls with a hierarchy of module instances involves replacing:

$$x*f(z)+y*f(z)$$

by the hierarchy of module instances $$\text{sum}(\text{mult}(x,\text{call}f(z)),\text{mult}(y,\text{call}f(z)))$$

which is represented by the flow diagram in FIG. 8C.

The preprocessor supplies stream C source modules, stream C source module instances and C source code for called functions as shown in FIG. 4A to the compiler. The compiler creates object modules, object module instances and object code as shown in step 406 of FIG. 4A. The construction of an object module 500 as shown in FIG. 5A is performed by the compiler. The module number field 502 is set to a unique number so that no other module in the object program has the same number. The execution unit field 504 is set to the number representing the execution unit on which all instances of the module are intended to run. If there is a compiler directive of the form:

set ExecutionUnit eu in the body of the source module, then the execution unit field 504 is set to eu.

The input-stream count field 506 is set to the number of input streams of the source module. The output-stream field 508 is set to the number of output streams of the source module. The inputs ready count field 510 is set to −m, where m is the input-stream count, unless there is a compiler directive of the form:

set InputsReadyCount irc in the body of the source module. In this case, the inputs ready count field 510 is set to irc. The outputs ready count field 512 is set to 0, unless there is a compiler directive of the form:

set OutputsReadyCount orc in the body of the source module. In this case, the outputs ready count field 512 is set to orc. The duration field 514 is set to 65536, unless there is a compiler directive of the form:

set Duration d in the body of the source module. In this case, the duration field 514 is set to d.

The code/configuration size field 520 is set to the size, in 32-bit words, of the code/configuration field 522. If the execution unit field 504 specifies a stored-program processor, then linkable and relocatable object code is placed in the code/configuration field 522. For each stream-related statement in the source code, object code is generated as will be described below. Standard stream C statements in the source code are compiled using conventional sequential-code compilation techniques. The object code includes all information needed by the linker/loader to link stream-related object code to conventionally compiled object code, stream sources and FIFO queues for input streams and stream destinations for output streams and relocate the linked executable in node memory as necessary. If the execution unit field 504 specifies reconfigurable hardware, then a linkable configuration is placed into the code/configuration field 522.

The variables/parameters size field 524 is set to the size, in 32-bit words, of the variables/parameters field 526. Initial values of local variables of the module thread-domain code are placed in the variables/parameters field 526 if the execution unit field 504 of the parent module specifies a stored-program processor. Initial parameter values are placed in the variables/parameters field 526 if the execution unit field 504 of the parent module specifies either application-specific or reconfigurable hardware.

The subfields of each of the input-stream fields 516 in FIG. 5B are populated by setting the bit in the QC field 530 to 1 (true) if the input stream is a quasi-constant stream and to 0 (false) otherwise and the bit in the ping field 532 to 1 (true) if the input stream is a ping stream and to 0 (false) otherwise. The data type size field 534 is set to the size, in 32-bit words, of the stream's data type. The consumer count field 536 is set to the default value of −1 unless there is a compiler directive of the form:

set inStrm ConsumerCount cc for the stream in the body of the source module. In this case, the consumer count field 536 is set to cc. The FIFO size field 538 is set to the encoding for the smallest power of two 32-bit words that accommodate two data values, unless there is a compiler directive of the form:

set inStrm FIFOsize fs for the stream in the body of the source module. In this case, the FIFO size field 540 is set to the encoding for the smallest power-of-two 32-bit words that accommodate fs data values. The initial FIFO values count field 540 is set to the number of initial values in the input stream's FIFO queue.

The initial values in the input-stream's FIFO queue at system initialization are placed in the initial FIFO values field 542 aligned on 32-bit boundaries. The values are listed first to last. The values for the stream are obtained from a compiler directive of the form:

set inStrm InitialFIFOvalues value0 value1 in the body of the source module. In this case, the initial FIFO values field 542 is set for inStrm to value0 value1 . . . . . The initial FIFO values field 542 is omitted if the initial FIFO values count is zero, which is the default.

Each of the subfields of the output-stream field 518 shown in FIG. 5B are populated as follows. The bit in the QC field 550 is set to 1 (true) if the output stream is a quasi-constant stream and to 0 (false) otherwise and the bit in the ping field 552 to 1 (true) if the output stream is a ping stream and to 0 (false) otherwise. The data type size field 554 is set to the size, in 32-bit words, of the stream's data type. The consumer count field 556 is set to the default value of −2 unless there is a compiler directive of the form:

set outStrm ProducerCount pc for the stream in the body of the source module. In this case, the producer count field 556 is set for the stream to pc.

As explained above, the Stream C compiler creates object code from the Stream C, thread domain code in the body of a source module. That task is greatly simplified for those source statements that belong to standard C since they can be compiled using the techniques of existing C compilers. For the remaining statements involving streams, various steps are performed as will be described below.

When the compiler encounters a statement of the form strm>>var;

where strm is a regular (non-pin g, non-quasi-constant) stream and var is a variable of a compatible type, the compiler inserts code in the object program that performs the following steps at runtime. Pt denotes the number of the node input port the linker/loader assigns to strm. The entry for port field 666 Pt in the node's consumer-counts table (CCT) is obtained. If the enable bit field 664 is zero in the CCT entry in FIG. 6D (indicating that the port is disabled), then an error is flagged and processing of the stream read is aborted. If the enable bit is one, a 16-bit signed integer is obtained from the consumer count field 670 of the CCT entry. CC denotes that number. If the sign bit of CC is 0 (CC is non-negative), then RP denotes the 16-bit, 32-bit-word (4-byte-word) read pointer that the object program maintains for input-port PT's FIFO queue. A data value is copied from the memory location pointed to by RP to the memory location of var. RP is incremented by the size (in 32-bit-words) of the stream's data type but only the N low-order bits of RP are allowed to toggle, where N is input-port, PT's FIFO size (as stored in input-port's PTT entry). The 16 N high-order bits of RP are kept fixed.

If CC is negative, the node parameter EU status is set to stalled port. The EU program counter is set to the first instruction of the read-stream object code. If the node's ready-to-run queue is non-empty, then a context switch is performed as will be described below. If the ready-to-run queue is empty, then nothing is done and the system waits for an event that causes the task to be either restarted or switched out.

When the compiler encounters a statement of the form
  strm>>var;
where strm is a quasi-constant stream and var is a variable of a compatible type, the compiler inserts code in the object program that performs the following at runtime. PT denotes the number of the node input port the linker/loader assigns to strm. The entry for port PT is obtained in the node's consumer-counts table (CCT). If the enable field 674 is zero in the CCT entry 672 in FIG. 6E indicating that the port is disabled, then an error is flagged and processing of the EU request is aborted. If the enable field is one, an atomic read-modify-write of the CCT entry begins. A Boolean value is obtained from the RP field 678 of the CCT entry 672 and ReadPosition denotes that Boolean value. A Boolean value is obtained from the latest value field 680 of the CCT entry 672 and denoted LatestValue. If ReadPosition is not the same as Latest Value, then RP is set to LatestValue and FL is set to 1 (true). The atomic read-modify-write of the CCT entry is ended.

A data value is copied from the LatestValue position of the input-port's FIFO queue to the memory location of var. The atomic read-modify-write of the CCT entry is begun. A Boolean value is obtained from the RP field 678 of the CCT entry 672 denoted as ReadPosition. A Boolean value is obtained from the LV field of the CCT entry and LatestValue denotes that Boolean value. If ReadPosition is not the same as LatestValue, then RP is set to LatestValue and FL is set to 1 (true). The atomic read-modify-write of the CCT entry is ended.

A Boolean value is obtained from the flip (FL) field 682 of the CCT entry 672 shown in FIG. 6E and Flip denotes that Boolean value. If Flip is 1 (true), then a pair of backward acknowledgements is set, both with an ack value of −1. One of the backward acknowledgements is to the source of strm and the other to input port PT. The first acknowledgement notifies the stream source that space has freed up in the port's FIFO queue for the next data value. The second acknowledgement resets the flip bit in the CCT entry to 0.

When the compiler encounters a statement of the form
  strm>>var;
where strm is a stream of type ping and var is a variable of type ping, the compiler inserts code in the object program that performs the following. PT denotes the number of the node input port the linker/loader assigns to strm. The entry for port PT is obtained in the node's consumer-counts table (CCT). If the enable field is zero in the CCT entry such as that in FIG. 6D, indicating that the port is disabled, then an error is flagged and processing of the stream read is aborted. If the enable field is one, a 16-bit signed integer denoted as CC is obtained from the consumer count field 670 of the CCT entry 672. If the sign bit of CC is zero (CC is non-negative), then a backward acknowledgement with an ack value of −1 is sent to strm's source and a forward acknowledgement with an ack value of −1 is sent to the input port PT. This self ack decrements the consumer count for port PT by 1.

When CC is negative, the node parameter EU status is set to stalled port. The EU program counter is set to the first instruction of the read-stream object code. If the node's ready-to-run queue is non-empty, then a context switch is performed. If the ready-to-run queue is empty, then nothing is done and the system waits for an event that causes the task to be either restarted or switched out.

When the compiler encounters a statement of the form
  strm<<var;
where strm is a regular (non-ping, non-quasi-constant) or quasi-constant stream and var is a variable of a compatible type, the compiler inserts code in the object program that performs the following. PT denotes the number of the node output port the linker/loader assigns to strm. The entry for port PT is obtained in the node's producer-counts table (PCT). If the enable field 688 is zero in the PCT entry 686 in FIG. 6F, indicating that the port is disabled, then an error is flagged and processing of the stream write is aborted. If the enable field 688 is one, a 16-bit signed integer denoted as PC is obtained from the producer count field 696 of the PCT entry. If the sign bit of PC is zero (PC is non-negative), then the current value of var to strm's destination(s) via one or more data words is sent to the output port PT.

When PC is negative, the node parameter EU status is set to stalled port. The EU program counter is set to the first instruction of the write-stream object code. If the node's ready-to-run queue is nonempty, then a context switch is performed. If the ready-to-run queue is empty, then nothing is done and the system waits for an event that causes the task to be either restarted or switched out.

When the compiler encounters a statement of the form
  strm<<var;
where strm is a stream of type ping and var is a variable of type ping, the compiler inserts code in the object program that performs the following. PT denotes the number of the node output port the linker/loader assigns to strm. The entry for port PT is obtained in the node's producer-counts table (PCT). If the enable field 688 is zero in the PCT entry 686 in FIG. 6F, indicating that the port is disabled, then an error is flagged and processing of the stream write is aborted. If the enable field 688 is one, a 16-bit signed integer denoted as PC is obtained from the producer count field of the PCT entry. If the sign bit of PC is zero (PC is non-negative), then a forward acknowledgement with an ack value of +1 is sent to strm's destination(s) and a backward acknowledgement with an ack value of +1 is sent to the output port PT. This self ack increments the producer count for port PT by 1.

When PC is negative, the node parameter EU status is set to stalled port. The EU program counter is set to the first instruction of the write-stream object code. If the node's ready-to-run queue is nonempty, then a context switch is performed. If the ready-to-run queue is empty, then nothing is done and the system waits for an event that causes the task to be either restarted or switched out.

When the compiler encounters a statement of the form
  strm<<ForwardAck(expr);
where strm is a stream and expr is an integer expression, the compiler inserts code in the object program that performs the following at runtime. The variable expr is evaluated. The resulting integer value is denoted as n. A forward acknowledgement, with an nn ack value of n, such as forward acknowledgment 710 in FIG. 7 is passed to the network.

When the compiler encounters a statement of the form
  strm<<BackwardAck(expr);
where strm is a stream and expr is an integer expression, the compiler inserts code in the object program that performs the following at runtime. The variable expr is evaluated. The resulting integer value is denoted as n. A backward acknowledgement, with the ack value of n, such as backward acknowledgement 720 in FIG. 7 is passed to the network if strm is a point-to-point stream or a backward acknowledgement 730 in FIG. 7 is passed to the network if strm is a broadcast stream.

When the compiler encounters a statement requiring read access to memory, the compiler inserts code in the object program that performs the following at runtime. Addr denotes the 40-bit, 32-bit-word (4-byte-word) address of the memory location from which the 32-bit datum is to be read. R denotes the 3-bit number of the EU general-purpose register into which the datum is to be loaded. The high-order 24 bits of Addr are interpreted as a node number and the low-order 16 bits of Addr are interpreted as a 32-bit-word (4-byte-word) node-memory address. Addr therefore has a node number and a memory address.

A 24-bit unsigned integer denoted as NID is obtained from the node's Node ID register. If the NID is the same as the high order 24 bits of Addr (the node number), then the read request is passed to the local node memory. If the NID is not the same, T denotes the task number the linker/loader assigns to the module instance and a memory-random-access (MRA) read such as the MRA read 740 in FIG. 7 is passed to the network. The node parameter EU status is set to stalled port. The EU program counter is set to the instruction immediately following the instruction that caused the memory read request. If the node's ready-to-run queue is non-empty, then a context switch is performed. If the ready-to-run queue is empty, then nothing is done and the system waits for an event that causes the task to be either restarted or switched out.

When the compiler encounters a statement requiring write access to memory, the compiler inserts code in the object program that performs the following at runtime. D denotes the 32-bit datum to be written. Addr denotes the 40-bit, 32-bit-word (4-byte-word) address of the memory location to which the 32-bit datum is to be written. The high-order 24 bits of Addr are interpreted as a node number and the low-order 16 bits of Addr are interpreted as a 32-bit-word (4-byte-word) node-memory address. A 24-bit unsigned integer is obtained from the node's Node ID register denoted as NID. If the high-order 24 bits of Addr are the same as NID, then the write request is passed to the local node memory. If not, a memory-random-access (MRA) write such as the MRA write 760 in FIG. 7 is passed to the network.

For each module instance in a Stream C program, the compiler constructs an object module instance 560 with the format described in FIG. 5D. The module instance number field 562 is set to a unique number so that no other module instance in the object program has the same number. The module number field 564 is set to the number of the object module of which this is an instance. The subfields of each input stream source field 566 are set. The source output-stream number field is set to the number of the object-module-instance output stream that is the source of this stream and the source module instance number field is set to the number of the object-module-instance containing the output stream that is the source of this stream. The subfields of each output stream destination field 568 are set by setting the destination input stream number field to the number of the object-module-instance input stream that is the destination of this stream and the destination module instance number field to the number of the object-module-instance containing the input stream that is the destination of this stream.

The module hierarchy is flattened (432) in FIG. 4B so that each module encapsulates just one of the following primitives: 1) an operation in a stream expression; 2) a function call in a stream expression; 3) a module whose body contains thread-domain code; and 4) a module whose body is defined externally.

Linker Loader

The linker loader produces linked and relocated executable modules (tasks) from the object modules and object module instances produced by the Stream C, or similar, compiler. The linker loader downloads those executable modules (tasks) to one or more nodes (cores) of a multi-node (multi-core) processor such as the adaptive computing engine 100 in FIG. 1 or the adaptive computing machine 160 in FIG. 2. The linker loader also configures special node registers and/or data structures, which are used at runtime to control execution of the downloaded executables (tasks) and control the flow of data between those executables (tasks).

Before any linking or loading is performed, certain node data structures must be initialized. For example, each entry in the task pointer table may be initially set to 0 indicating that the entry is null. The enable bit is set to 0 (false) in each entry in both the node input-port table and the node output-port table. The 0 indicates that the port is disabled (unassigned to a task). The read and write pointers for the ready-to-run Queue are initialized so that they reflect an empty queue.

As explained above, the stream-based compiler supplies to the stream-based linker a binary file containing object modules, object module instances and executables for called functions. The linker performs the steps outlined in FIG. 4C, which is a flow diagram of the linker performing steps 412, 414 and 416 in FIG. 4A. The linker obtains an object file from the compiler (440).

The linker first flattens the module hierarchy (442) so that each object module encapsulates just one of: (1) an operation in a stream expression, (2) a function call in a stream expression or (3) a module whose body contains thread-domain code. If stream expressions are converted to thread-domain modules as described above, then the flattening (442) produces only modules whose body contains thread-domain code.

The linker then makes assignments and allocates memory (414). The linker assigns a node and task to each object module instance, a node input port to each object input stream and a node output port to each object output stream. The linker allocates space in node memories for executables, input FIFO queues, variables & stacks and task-related tables as explained above.

The result of the assignments and allocations (414) is a set of binary tasks. Each binary task represents an object module instance and contains node and port assignments, memory allocations, a pointer to an object-module executable, pointers to executables for called functions, initial values for program variables and input FIFO queues and configuration data.

Figure 9:
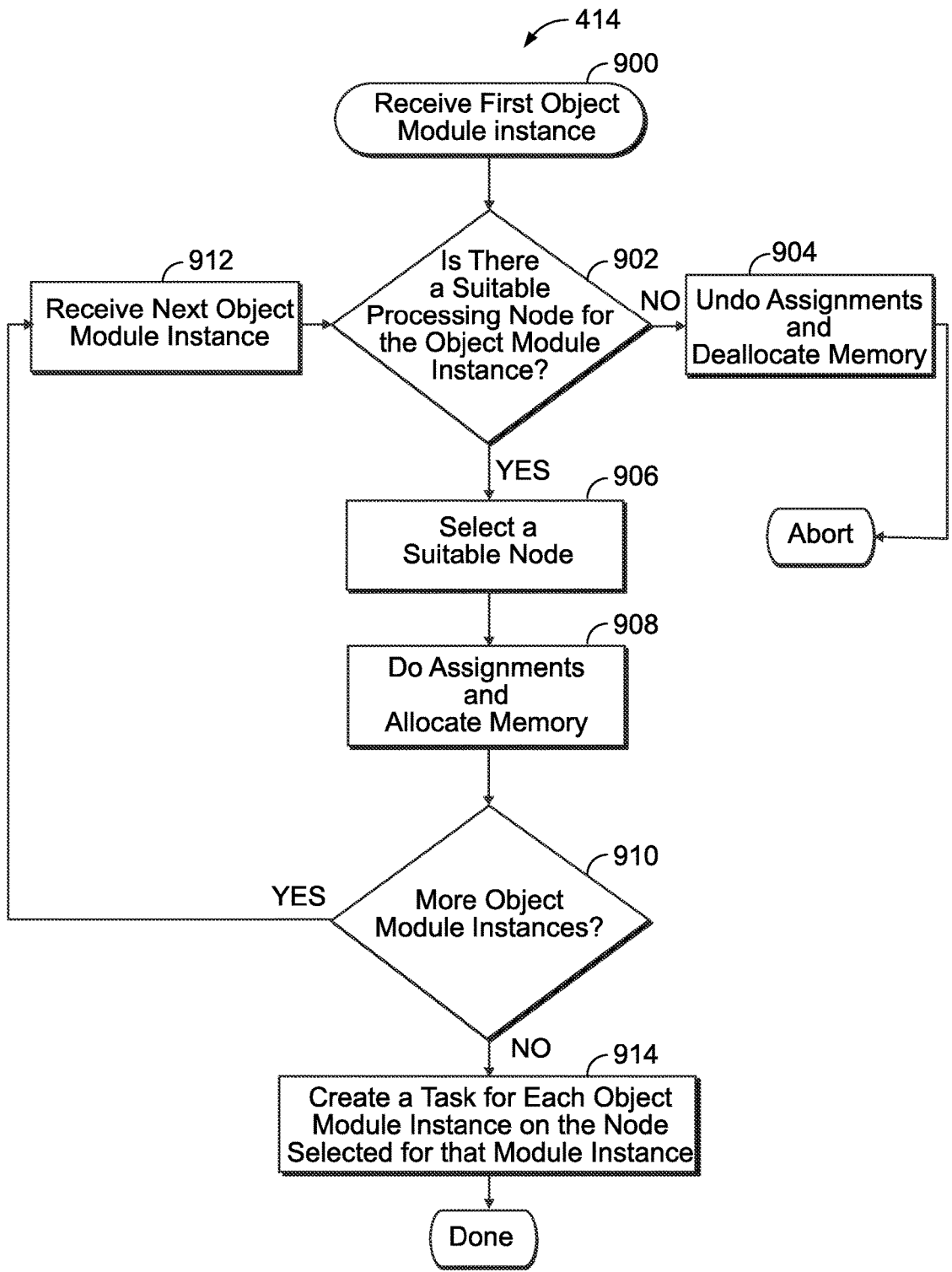
FIG. 9 is a flow diagram of the process of loading the object code onto the nodes.

The process of assignments and allocating memory (414) in FIG. 4C is outlined in the flow diagram in FIG. 9. The linker receives a first instance of an object module (900). The linker then determines whether there are nodes that can serve as suitable hosts for the object module instances (tasks) (902). A processing node is a suitable host for an object module instance if and only if it satisfies all of the following. The node must have at least one unassigned task number. The node must have a separate, unassigned input port for each input stream of the object module instance. That means that the number of unassigned node input ports must be greater than or equal to the input-stream count in the parent module of the object module instance. The node must have a separate, unassigned output port for each output stream of the object module instance. That means that the number of unassigned node output ports must be greater than or equal to the output-stream count in the parent module of the object module instance. Finally, there must be sufficient available space in one or more node memories that are suitably close (as decided by an algorithm) to the suitable node to accommodate a new task parameter list (TPL) data structure, input FIFO queues for the new task, the executable module for the new task, functions called, either directly or indirectly, by the executable module, initial values of task variables, a task stack (if required) and other task-specific memory requirements. Ideally, all of the memory requirements are accommodated within the memory of a single node.

If no suitable node is found, the process undoes assignments and deallocates memory (904) and aborts the process. If a suitable node is determined, a node is selected for (assigned to) the object module instance (906). For homogeneous architectures, there are no restrictions on which processing node, from among the set of suitable processing nodes, is assigned to an object module instance (task). The selection process, however, is typically carried out in a way that tends to minimize traffic in the inter-nodal network. So, for example, two tasks with heavy inter-task traffic will tend to be placed either on the same node or two nodes that are close together. For heterogeneous architectures, such as the adaptive computing engine 100 in FIG. 1 or the adaptive computing engine of 160 of FIG. 2, the node-selection process is more complicated since tasks may be mappable onto more than one node type.

The linker then assigns ports and allocates memory (908). A separate, currently unassigned input port of the selected node is assigned to each task input stream. A separate, currently unassigned output port of the selected node is assigned to each task output stream. Such available input and output ports must exist since the selected node has been determined to be suitable for the object module instance. The choice of an available input and output port is completely arbitrary and has no impact on performance. Space is allocated in one or more node memories for a new node task data structure, input FIFO queues for the new task, the executable module for the new task, functions called, either directly or indirectly, by the executable module, initial values of task variables, a task stack (if required) and other task-specific memory requirements.

The linker determines whether there are additional object module instances (910). If there are additional object module instances, the linker loops back and receives the next object module instance (912). If there are not additional object module instances, for each object module instance, a binary data structure is created (914) representing a task. Each data structure contains node and port assignments, memory allocations, a pointer to an object-module executable, pointers to executables for called functions, initial values for program variables and input FIFO queues and configuration data.

Returning to FIG. 4C, the linker then performs dynamic linking (444) by using dynamic-link libraries (DLLs) to resolve any remaining non-stream-related references in the object code. The linker then performs stream-related linking (446). This is performed by linking task object code to input streams, input FIFO queues, output streams and a task parameter list (TPL). At the end of this phase, all symbolic references in task object code to node numbers, port numbers, task numbers, TPL fields and memory locations have been replaced with actual references.

The stream-based linker supplies a set of binary tasks (448), each representing an object module instance, to the stream-based loader. Each binary task contains node and port assignments, memory allocations, a pointer to an object-module executable, pointers to executables for called functions, initial values for program variables and input FIFO queues and configuration data.

FIG. 4D shows a flow diagram of the steps in loading a stream-based binary into a multi-node (multi-core) computer such as the adaptive computing engine in FIG. 1. As explained above, the tasks are received from the linker (460). The tasks are binary data representing an object module instance and contain node and port assignments, memory locations, a pointer to an object module executable, pointers to executables for called functions, initial values for program variables and input FIFO queues and configuration data. The linker loads setup code and teardown code (462), if needed. For each node hosting a task, one copy of task setup code and one copy of task teardown code is loaded into the space allocated in the node's memory, if needed.

The loader then loads tasks (464). Loading tasks involves: loading either a separate copy of the object-module executable for each instance of the object module running on the node, or a shared copy of the object module's executable for the instances of the object module running on the node. For each node assigned instances of an object module, either the separate copy or shared copy is loaded into the space allocated in the node's memory (or the memories of nearby nodes). Executables for functions called, directly or indirectly, by the object-module executable are loaded. Initial values for program variables and input FIFO queues for each instance of the object module running on the node are loaded and a configured task parameter list (TPL) for each instance of an object module running on the node is loaded.

The loader then configures nodes (466). This involves configuring the node input and output ports, including consumer and producer counts, assigned to the task for each task downloaded to a node. For each input port assigned to the task, the port's entry in the assigned node's port-to-address-translation table is configured. Entries for regular and quasi-constant ports are configured appropriately, and any initial values in the FIFO queues are configured. A pointer to the task's task parameter list (TPL) is interested into the task's entry in the assigned-node's TPL pointers table. The task's entry is configured in the assigned-node's State Information Table (SIT). The task is placed on the assigned-node's ready-to-run queue if the task is ready to run at program start. The loader then enables the newly configured ports and tasks (468). The object code is then handed off to run time (470).

Runtime System

The runtime system residing on each processing node of a multi-node system such as the adaptive computing engine 100 in FIG. 1 or the adaptive computing machine 160 in FIG. 2, manages execution of tasks on the node and flow control between tasks on the node and other tasks running on the same or different nodes. The node runtime system may be implemented in software (residing in the node memory), hardware (residing in the node wrapper) or some combination of the two.

The node runtime system is event driven and responds to the following types of events: (1) arrival of a data word 700 in FIG. 7, (2) arrival of a forward acknowledgement 710, (3) arrival of a backward acknowledgement 720 or 730, (4) arrival of a memory-random-access (MRA) read 740, (5) arrival of a memory-random-access (MRA) read data 750, (6) arrival of a memory-random-access (MRA) write 760 in FIG. 7, (7) an executing task times out, (8) an executing task blocks and (9) a task completes execution. Even though the steps in each event response are listed sequentially, some of those steps may be performed concurrently.

When a data word such as the data word 700 in FIG. 7 arrives at a node's network input, the node's runtime system performs the following. The runtime system obtains an 8-bit unsigned integer from the input port field of the data word 700 denoted by Pt. The entry for port Pt is obtained from the node's Consumer-Counts Table (CCT). That entry for a regular stream has the format shown in FIG. 6D. The entry for a quasi-constant stream has a format shown in FIG. 6E. If the enable bit is zero in the CCT entry (indicating that the port is disabled), then processing of the data word is aborted. If the enable bit is one, then the process continues. If the ping bit is one in the CCT entry indicating that this is a ping port, then processing of the data word is aborted since a data word should not be arriving on a ping port.

The entry for port Pt is obtained in the node's port-to-address translation table (PTT). A 16-bit, 32-bit-word (4-byte-word) address is obtained from the FIFO write address field of the PTT entry where Addr denotes the address. A 32-bit datum from the data field of the data word is obtained, and that datum is written to node memory at the 32-bit-word (4-byte-word) address, Addr. A 4-bit unsigned integer is obtained from the FIFO size field of the PTT entry and N denotes that number. Addr is incremented by 1 but the N low-order bits of Addr are allowed to toggle while keeping the 16-N high-order bits of Addr fixed. This updated address is stored in the FIFO write address field of the PTT entry.

When a forward (consumer-count) acknowledgement such as the forward acknowledgement 710 in FIG. 7 arrives at a node's network input, the node's runtime system performs the following. An 8-bit unsigned integer from the input port field of the forward acknowledgement 710 is denoted Pt. The entry for port Pt is obtained in the node's Consumer-Counts Table (CCT). That entry has the format shown in FIG. 6D for a regular stream. The entry has the format shown in FIG. 6E for a quasi-constant stream.

If the enable bit is zero in the CCT entry (indicating that the port is disabled), then processing of the forward acknowledgement is aborted. Otherwise, 16-bit signed integer is obtained from the acknowledgement value field of the forward acknowledgement 710 and is denoted AV. If the port is for a regular stream, then an atomic read-modify-write of the CCT entry begins. A 16-bit signed integer is obtained from the consumer count field of the CCT entry which is denoted OldCC. AV is added to OldCC the result is stored in the consumer count field of the CCT entry and denoted NewCC. The atomic read-modify-write of the CCT entry is ended.

If the sign bits of OldCC and NewC are the same, then processing of the forward acknowledgement is ended. Otherwise, a 4-bit unsigned integer is obtained from the task number field of the CCT entry and T denotes that number. The entry for task T is obtained in the node's state information table (SIT). An atomic read-modify-write of the SIT entry is begun. A 9-bit signed integer is obtained from the inputs ready count field of the SIT entry and denoted by OldIRC. If the sign bit of NewCC is 0 (the consumer count made a transition from negative to non-negative), then OldIRC is incremented by 1 and the result is stored in the inputs ready count field of the SIT entry. NewIRC denotes this newly updated count. If the sign bit of NewCC is one indicating the consumer count made a transition from non-negative to negative) OldIRC is decremented by 1 and the result is stored in the inputs ready count field of the SIT entry. The atomic read-modify-write of the SIT entry is then ended.

If the sign bit of NewCC is zero indicating the consumer count made a transition from negative to non-negative, then a 9-bit signed integer is obtained from the outputs ready count field of the SIT entry denoted by ORC. A 2-bit unsigned integer is obtained from the status field of the SIT entry denoted by S. If the sign bit of OldIRC is 1, the sign bit of NewIRC is zero, the sign bit of ORC is 0 and S is idle or run, then the task, T is wakened. This is because these conditions mean that the task's input/output streams have made a transition from not ready to ready. The steps involved in waking a task are described below.

If the port is for a quasi-constant stream, the atomic read-modify-write of the CCT entry in FIG. 6E is begun. A Boolean value is obtained from the LV field 680 of the CCT entry and is denoted by LatestValue. The LatestValue is set to not LatestValue. LV is set to LatestValue and the atomic read-modify-write of the CCT entry is ended.

If LatestValue is one, indicating a value must have just been written into the upper position of the FIFO queue, then wraparound the FIFO-queue write pointer. The entry for port Pt is obtained in the node's port-to-address translation table (PTT). A 16-bit, 32-bit-word (4-byte-word) address is obtained from the FIFO write address field of the PTT entry and Addr denotes that address. A 4-bit unsigned integer denoted N is obtained from the FIFO size field of the PTT entry. The low-order N bits of Addr are set to 0 while leaving the 16-N high-order bits unchanged. The updated address is stored in the FIFO write address field of the PTT entry.

When a backward (producer-count) acknowledgement such as either the backward acknowledgements 720 or 730 in FIG. 7 arrives at a node's network input, the node's runtime system performs the following. An 8-bit unsigned integer is obtained from the output port field of the backward acknowledgement and is denoted Pt. The entry for port Pt is obtained in the node's producer-counts table (PCT).

If the enable bit is zero in the PCT entry such as that in FIG. 6F (indicating that the port is disabled), then processing of the backward acknowledgement is aborted. Otherwise, a 16-bit signed integer from the Acknowledgment Value field of the backward acknowledgement denoted AV is obtained. The atomic read-modify-write of the PCT entry is begun. A 16-bit signed integer is denoted OldPC and obtained from the producer count field 696 of the PCT entry. AV is added to OldPC, and the result is stored in the producer count field 696 of the PCT entry and is denoted NewPC. The atomic read-modify-write of the PCT entry is ended.

If the sign bits of OldPC and NewPC are the same, then processing of the backward acknowledgement is ended. Otherwise, a 4-bit unsigned integer is obtained from the task number field of the PCT entry and is denoted by T. The entry for task T is obtained in the node's state information table (SIT).

The atomic read-modify-write of the SIT entry is begun. A 9-bit signed integer is obtained from the outputs ready count field of the SIT entry and denoted as OldORC. If the sign bit of NewPC is 1 indicating the producer count made a transition from non-negative to negative, then OldORC is incremented by 1 and the result is stored in the outputs ready count field of the SIT entry. NewORC denotes this newly updated count. If the sign bit of NewPC is zero indicating the producer count made a transition from negative to non-negative, OldORC is decremented by 1 and the result is stored in the outputs ready count field of the SIT entry. The atomic read-modify-write of the SIT entry is ended.

If the sign bit of New PC is 1, indicating the producer count made a transition from non-negative to negative, then a 9-bit signed integer is obtained from the inputs ready count field of the SIT entry and is denoted IRC. A 2-bit unsigned integer is obtained from the status field of the SIT entry and denoted S. If the sign bit of OldORC is 1, the sign bit of NewORC is 0, the sign bit of IRC is 0 and S is idle or run then the task T is wakened. The sign bits indicate that the task's input/output streams have made a transition from not ready to ready.

When a memory read access data such as the MRA read data word 750 in FIG. 7 arrives at a node's network input, the node's runtime system performs the following. A 16-bit, 32-bit-word (4-byte-word) node memory address is obtained from the node memory address field of the MRA read 740 in FIG. 7 and is denoted Addr. A 24-bit unsigned integer is obtained from the requesting node field of the MRA read 740 in FIG. 7 and is denoted N. A 4-bit unsigned integer is obtained from the task field of the MRA read 740 and is denoted T. A 3-bit unsigned integer from the GP Reg field of the MRA Read 740 and is denoted R. A 32-bit datum denoted as D is read from the node memory at the 32-bit-word (4-byte-word) address Addr. A Memory-Random-Access (MRA) read data such as the MRA read data word 750 in FIG. 7 is passed to the network with the above values.

When a memory-read-access (MRA) read data such as the MRA read data 750 in FIG. 7 arrives at a node's network input, the node's runtime system performs the following. A 4-bit unsigned integer denoted as T is obtained from the task field of the MRA Read Data. A 3-bit unsigned integer denoted by R is obtained from the GPReg field of the MRA Read Data. A 32-bit datum denoted as D is obtained from the Data field of the MRA Read Data. A 4-bit unsigned integer denoted EU_T is obtained from the node parameter EU task.

If EU_T is the same as T, then a 2-bit unsigned integer denoted as EU_S is obtained from the node parameter EU status. If S is not a stalled memory, then an error is flagged, the task T is aborted and processing of the MRA Read Data is aborted. Otherwise, if S is a stalled memory, D is loaded into the EU general-purpose register R and the node execution unit is given the Go signal to begin executing. The node parameter EU is set to running.

IF EU_T is not the same as T, a pointer to the task T's Task Parameter List (TPL) is obtained from the node's TPL Pointers Table. D is stored in the general-purpose register R field of task T's Task Parameter List. The task is wakened.

When a memory-read-access (MRA) write such as the MRA write 760 in FIG. 7 arrives at a node's network input, the node's runtime system performs the following. A 16-bit, 32-bit-word (4-byte-word) node memory address denoted Addr is obtained from the node memory address field of the MRA write. A 32-bit datum denoted as D is obtained from the data field of the MRA write. D is written to the node memory at the 32-bit-word (4-byte-word) address Addr.

When a task is executing on a node and the EU countdown timer underflows, the runtime system performs the following. The execution unit is halted. A 4-bit unsigned integer denoted as T is obtained from the node parameter EU task. A pointer to task T's task parameter list (TPL) is obtained from the node's TPL pointers table. A 32-bit unsigned integer denoted D is obtained from the duration of the task T's task parameter list. The EU countdown timer parameter is set to D. If the node's ready-to-run queue is empty, then the GO signal to begin executing is given to the node execution unit. If the ready-to-run queue is not empty, a context switch is performed.

An executing task blocks when the runtime system attempts to read from an input stream with insufficient data in its FIFO queue (as indicated by a negative consumer count) or attempts to write to an output stream with insufficient space in the downstream FIFO queue(s) (as indicated by a non-negative producer count). When either of these events occurs, the node's runtime system performs the following. If the node's ready-to-run queue is non-empty, then a context switch is performed. If the node's ready-to-run queue is empty, the node parameter EU status is set to stalled port and the runtime system waits for an event that causes task T to be either restarted or switched out.

A task executing on a processing node can (voluntarily) terminate execution by either executing a return statement or by falling off the end of the program. When either of these events occurs, the node's runtime system performs the following. A 4-bit unsigned integer denoted as T is obtained from the node parameter EU Task. A pointer to the task T's task parameter list (TPL) is obtained from the node's TPL pointers table. A node-memory pointer denoted by Ptr is obtained from the executable pointer field of task T's task parameter list (TPL). The EU program counter is set to Ptr. The entry for task T is obtained in the node's state information table (SIT) with a status field, an inputs ready count field and an outputs read count field.

A 9-bit signed integer denoted as IRC is obtained from the inputs ready count field of the SIT entry. A 9-bit signed integer denoted as ORC is obtained from the outputs ready count field of the SIT entry. If the sign bits of IRC and ORC are both 0 indicating that the task's inputs and outputs are both still ready, then the node execution unit is given the GO signal to begin running. If the node's ready-to-run queue is non-empty, then a context switch is performed. If the node's ready-to-run queue is empty, the node parameter EU status is set to stalled port and the runtime system waits for an event that causes task T to be either restarted or switched out.

Several of the event responses of the preceding involve actions such as waking a task, setting up a task, tearing down a task and performing a context switch. In order to wake a task, the runtime system obtains the entry for task T in the node's state information table (SIT). The entry has a status field, an inputs ready count field and an outputs ready count field. A 2-bit unsigned integer denoted as TS is obtained from the status field of the SIT entry. If TS is running and the EU status is either a stalled port or a stalled memory, then the node execution unit is given the GO signal to begin executing. The node parameter EU status is set to running.

If TS is idle, then a 2-bit unsigned integer denoted as EUS is obtained from the node parameter EU Status. If EUS is idle, then the task T is set up. If TS is not idle, the task T is placed on the node ready-to-run queue and the status field of task T's SIT entry is set to ready.

The action of setting up a task must be performed before a task can execute on a processing node. A node's runtime system performs the following in setting up a task. A pointer to task T's task parameter list (TPL) is obtained from the node's TPL pointers table. The contents of the TPL stack pointer field are transferred to the EU stack pointer register. The contents of the TPL program counter field are transferred to the EU program counter register. The contents of the TPL countdown timer field are transferred to the EU countdown timer register. The contents of the TPL general-purpose register fields 0-7 are transferred to the respective EU general-purpose registers 0-7. The pointer to the TPL program variables field is transferred to the EU program variables pointer register.

The entry for task T is obtained from the node's state information table (SIT). The node execution unit is given the GO signal to begin executing. The node parameter EU status is set to running and the status field of task T's SIT entry is set to running.

In order for a task to be set up, the previously executing task (if any) must first be torn down. A node's runtime system performs the following in tearing down a task. A 4-bit unsigned integer denoted as T is obtained from the node parameter EU task. A pointer to task T's task parameter list (TPL) is obtained from the node's TPL Pointers Table. The contents of the EU program counter register are transferred to the TPL program counter field. The contents of the EU countdown timer register are transferred to the TPL countdown timer field. The contents of the EU general-purpose registers 0-7 are transferred to the respective TPL general-purpose register fields 0-7. A 2-bit unsigned integer denoted as EUS is obtained from the node parameter EU status. The entry for task T is obtained from the node's State Information Table (SIT). If EUS is a stalled port or S is a stalled memory then the status field of task T's SIT entry is set to idle. If neither of these conditions exists, the task T is placed on the node ready-to-run queue and the status field of task T's SIT entry is set to ready. The node parameter EU status is set to idle.

When an executing task terminates execution (for whatever reason) and the node ready-to-run queue is nonempty, the node's runtime system does a context switch. A context switch includes obtaining a 2-bit unsigned integer denoted as S from the node parameter EU status. If S is not idle, then a 4-bit unsigned integer denoted as T1 is obtained from the node parameter EU task and the task T1 is torn down as explained above. If the ready-to-run queue is not empty, the next task is removed from the ready-to-run queue and denoted T2. The task T2 is set up according to the procedure above.

The computer to run the compiler, linker, loader and runtime components may include a central processing unit (CPU), controller or processor, a memory, and an interface system which are coupled together by a bus or other link, although other numbers and types of each of the components and other configurations and locations for the components can be used. The processors in the computer for the compiler, linker, loader and runtime components described herein may execute a program of stored instructions for one or more aspects of the methods and systems as described herein, including for determining regions of clearance violations, although the processor could execute other types of programmed instructions. The memory may store these programmed instructions for one or more aspects of the methods and systems as described herein, including the method for determining regions of clearance violations, although some or all of the programmed instructions could be stored and/or executed elsewhere.

A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, may be used for the memory. The user input device may comprise a computer keyboard and a computer mouse, although other types and numbers of user input devices may be used. The display may comprise a computer display screen, such as a CRT or LCD screen by way of example only, although other types and numbers of displays could be used.

Although the invention has been described with respect to specific embodiments, thereof, these embodiments are merely illustrative, and not restrictive of the invention. For example, any type of processing units, functional circuitry or collection of one or more units and/or resources such as memories, I/O elements, etc., can be included in a node. A node can be a simple register, or more complex, such as a digital signal processing system. Other types of networks or interconnection schemes than those described herein can be employed. It is possible that features or aspects of the present invention can be achieved in systems other than an adaptable system, such as described herein with respect to a preferred embodiment.

We claim:

1. A method of converting a source code program including stream domain code having multiple parallel computing construct program streams and thread domain code for execution on a multiple node computing device, called functions, and a ping stream expression, comprising machine executable code which when executed by at least one machine, causes the machine to:
   convert the source code program to a converted program including object modules, object module instances and executables;
   receive a data structure containing source modules, source module instances and source code for called functions and for each operation and for each function call;
   create or retrieve a separate source module that includes:
      identical input streams to the inputs of the operation or function;
      a single output stream with the same type as the output of the operation or function; and
      thread-domain code that:
         consumes a single ping value from each input stream and supplies those ping values to an instance of the operation or a function call;
      puts the ping value resulting from the operation or function call into the module output stream;
      sends an appropriate forward acknowledgement to the destination stream;
      sends an appropriate backward acknowledgement to an output port, wherein only the forward and backward acknowledgements are sent;
      read a first and a second object module instance converted from the source code program including stream domain code and thread domain code, wherein the first object module instance is a stream source of a program stream of the multiple parallel computing construct program streams and the second object module instance is at least one stream destination of the program stream, wherein the program stream conveys ping values from the stream source to the at least one stream destination; and
   match the object module instances to at least one of a plurality of cores on the multiple core computing device.

2. The method of claim 1, wherein multiple pings are sent from each input stream.

3. The system of claim 1, wherein the destination module is in a sleep mode until the ping is received.

4. The method of claim 1, wherein the source module is in a wait mode after sending the ping.

5. The method of claim 1, wherein the compiler identifies the stream as a ping stream.

6. The method of claim 1, wherein a node input port is configured to provide forward acknowledgments to a task executing on the node.

7. The method of claim 1, wherein a node output port is configured to accept forward acknowledgments from a task executing on the node.

8. A system to convert a source code stream based program including multiple parallel computing construct program streams to execute on a multiple node computing device, the system comprising:
  a compiler executing on a hardware controller of the system to convert the source code stream based program to a converted program including object modules, object module instances and executables, at least one object module instance being a stream source of one program stream of the multiple parallel computing construct program streams and at least one object module instance being at least one stream destination of the program stream, wherein the program stream conveys a ping from the stream source to the at least one stream destination and wherein the compiler receives a data structure containing source modules, source module instances and source code for called functions and for each operation and for each function call, and wherein the compiler creates or retrieves a separate source module that includes:
  identical input streams to the inputs of the operation or function;
  a single output stream with the same type as the output of the operation or function;
  a thread-domain code that:
    consumes a ping value from each input stream and supplies those ping values to an instance of the operation or a function call;
    puts the ping value resulting from the operation or function call into the module output stream;
    sends an appropriate forward acknowledgement to the destination stream; and
    sends an appropriate backward acknowledgement to an output port, wherein only the forward and backward acknowledgements are sent;
  a linker executing on a hardware controller of the system to match the object module instances of the program stream to at least one of the multiple nodes;
  a loader executing on a hardware controller of the system to load tasks required by the object modules in the nodes and configure cores of the multiple node computing device matched with the object module instances; and
  a runtime component to run the converted program on the multiple core computing device.

9. The system of claim 8, wherein multiple pings are sent from each input stream.

10. The system of claim 8, wherein the destination module is in a sleep mode until the ping is received.

11. The system of claim 8, wherein the source module is in a wait mode after sending the ping.

12. The system of claim 8, wherein the compiler identifies the stream as a ping stream.

13. The system of claim 8, wherein a node input port is configured to provide forward acknowledgments to a task executing on the node.

14. The system of claim 8, wherein a node output port is configured to accept forward acknowledgments from a task executing on the node.

15. A non-transitory, machine-readable medium having stored thereon instructions for converting a source code program including stream domain code having multiple parallel computing construct program streams and thread domain code for execution on a multiple node computing device, called functions, and a ping stream expression, comprising machine executable code which when executed by at least one machine, causes the machine to:
  convert the source code program to a converted program including object modules, object module instances and executables;
  receive a data structure containing source modules, source module instances and source code for called functions and for each operation and for each function call; and
  create or retrieve a separate source module that includes:
    identical input streams to the inputs of the operation or function;
    a single output stream with the same type as the output of the operation or function; and
    thread-domain code that:
      consumes a single ping value from each input stream and supplies those ping values to an instance of the operation or a function call;
      puts the ping value resulting from the operation or function call into the module output stream;
      sends an appropriate forward acknowledgement to the destination stream;
      sends an appropriate backward acknowledgement to an output port, wherein only the forward and backward acknowledgements are sent;
    read a first and a second object module instance converted from the source code program including stream domain code and thread domain code, wherein the first object module instance is a stream source of a program stream of the multiple parallel computing construct program streams and the second object module instance is at least one stream destination of the program stream, wherein the program stream conveys ping values from the stream source to the at least one stream destination; and
  match the object module instances to at least one of a plurality of cores on the multiple core computing device.

* * * * *